(12) United States Patent
Carney et al.

(10) Patent No.: US 12,474,820 B2
(45) Date of Patent: Nov. 18, 2025

(54) PROVIDING SUPPLEMENTAL CONTENT FOR A SECOND SCREEN EXPERIENCE

(71) Applicant: Comcast Cable Communications, LLC, Philadelphia, PA (US)

(72) Inventors: John Carney, Sausalito, CA (US); Greg Thomson, Mill Valley, CA (US); Don Ahrens, San Francisco, CA (US); Justin Gravante, Audubon, NJ (US); Andrew Evans, West Chester, PA (US); Jill McLaughlin, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/851,814

(22) Filed: Apr. 17, 2020

(65) Prior Publication Data

US 2020/0356228 A1    Nov. 12, 2020

Related U.S. Application Data

(63) Continuation of application No. 13/803,274, filed on Mar. 14, 2013, now Pat. No. 10,664,138.

(51) Int. Cl.
*G06F 3/0484* (2022.01)
*H04N 21/235* (2011.01)
(Continued)

(52) U.S. Cl.
CPC ......... *G06F 3/0484* (2013.01); *H04N 21/235* (2013.01); *H04N 21/2408* (2013.01);
(Continued)

(58) Field of Classification Search
None
See application file for complete search history.

(56) References Cited

U.S. PATENT DOCUMENTS

| 5,287,489 A | 2/1994 | Nimmo et al. |
| 5,321,750 A | 6/1994 | Nadan |

(Continued)

FOREIGN PATENT DOCUMENTS

| EP | 0624039 A2 | 11/1994 |
| EP | 0963115 A1 | 12/1999 |

(Continued)

OTHER PUBLICATIONS

Fernando Pereira, "The MPEG-4 Book", Prentice Hall, Jul. 10, 2002.

(Continued)

*Primary Examiner* — Mandrita Brahmachari
(74) *Attorney, Agent, or Firm* — Banner & Witcoff, Ltd.

(57) ABSTRACT

Computing devices, computer-readable media storing computer-executable instructions, methods, and systems for discovering, organizing, and presenting supplemental content are disclosed. A discovery system may be used to discover an item, such as a supplemental content presentation application, which, when launched may present supplemental content to a user while the user is consuming primary content. The supplemental content presentation application may also present a timeline that users may interact with to view different portions of the supplemental content. The timeline may also be modified by adding markers along the timeline so that when a marker is selected, a particular piece of supplemental content is presented.

27 Claims, 22 Drawing Sheets

(51) Int. Cl.

| | |
|---|---|
| *H04N 21/24* | (2011.01) |
| *H04N 21/258* | (2011.01) |
| *H04N 21/2665* | (2011.01) |
| *H04N 21/41* | (2011.01) |
| *H04N 21/43* | (2011.01) |
| *H04N 21/431* | (2011.01) |
| *H04N 21/435* | (2011.01) |
| *H04N 21/47* | (2011.01) |
| *H04N 21/472* | (2011.01) |
| *H04N 21/4722* | (2011.01) |
| *H04N 21/4788* | (2011.01) |
| *H04N 21/6547* | (2011.01) |
| *H04N 21/658* | (2011.01) |
| *H04N 21/6587* | (2011.01) |
| *H04N 21/81* | (2011.01) |
| *H04N 21/84* | (2011.01) |
| *H04N 21/845* | (2011.01) |
| *H04N 21/8547* | (2011.01) |
| *H04N 21/233* | (2011.01) |
| *H04N 21/234* | (2011.01) |
| *H04N 21/25* | (2011.01) |
| *H04N 21/433* | (2011.01) |
| *H04N 21/4782* | (2011.01) |

(52) U.S. Cl.
CPC .. *H04N 21/25808* (2013.01); *H04N 21/25866* (2013.01); *H04N 21/2665* (2013.01); *H04N 21/4122* (2013.01); *H04N 21/41265* (2020.08); *H04N 21/43079* (2020.08); *H04N 21/4312* (2013.01); *H04N 21/4316* (2013.01); *H04N 21/435* (2013.01); *H04N 21/47* (2013.01); *H04N 21/47214* (2013.01); *H04N 21/47217* (2013.01); *H04N 21/4722* (2013.01); *H04N 21/4788* (2013.01); *H04N 21/6547* (2013.01); *H04N 21/6581* (2013.01); *H04N 21/6587* (2013.01); *H04N 21/8133* (2013.01); *H04N 21/8173* (2013.01); *H04N 21/84* (2013.01); *H04N 21/8455* (2013.01); *H04N 21/8547* (2013.01); *H04N 21/233* (2013.01); *H04N 21/23418* (2013.01); *H04N 21/251* (2013.01); *H04N 21/4334* (2013.01); *H04N 21/4782* (2013.01); *H04N 21/6582* (2013.01)

(56) References Cited

U.S. PATENT DOCUMENTS

| | | | |
|---|---|---|---|
| 5,353,121 | A | 10/1994 | Young et al. |
| 5,485,221 | A | 1/1996 | Banker et al. |
| 5,521,841 | A | 5/1996 | Arman et al. |
| 5,530,939 | A | 6/1996 | Mansfield, Jr. et al. |
| 5,583,563 | A | 12/1996 | Wanderscheid et al. |
| 5,589,892 | A | 12/1996 | Knee et al. |
| 5,592,551 | A | 1/1997 | Lett et al. |
| 5,594,509 | A | 1/1997 | Florin et al. |
| 5,613,057 | A | 3/1997 | Caravel |
| 5,621,456 | A | 4/1997 | Florin et al. |
| 5,657,072 | A | 8/1997 | Aristides et al. |
| 5,659,793 | A | 8/1997 | Escobar et al. |
| 5,666,645 | A | 9/1997 | Thomas et al. |
| 5,675,752 | A | 10/1997 | Scott et al. |
| 5,694,176 | A | 12/1997 | Bruette et al. |
| 5,737,552 | A | 4/1998 | Lavallee et al. |
| 5,801,700 | A * | 9/1998 | Ferguson .......... H04L 9/40 715/839 |
| 5,802,284 | A | 9/1998 | Karlton et al. |
| 5,826,102 | A | 10/1998 | Escobar et al. |
| 5,844,620 | A | 12/1998 | Coleman et al. |
| 5,850,218 | A | 12/1998 | LaJoie et al. |
| 5,852,435 | A | 12/1998 | Vigneaux et al. |
| 5,860,073 | A | 1/1999 | Ferrel et al. |
| 5,883,677 | A | 3/1999 | Hofmann |
| 5,892,902 | A | 4/1999 | Clark |
| 5,892,905 | A | 4/1999 | Brandt et al. |
| 5,905,492 | A | 5/1999 | Straub et al. |
| 5,929,849 | A | 7/1999 | Kikinis |
| 5,945,987 | A | 8/1999 | Dunn |
| 5,960,194 | A | 9/1999 | Choy et al. |
| 5,990,890 | A | 11/1999 | Etheredge |
| 5,996,025 | A | 11/1999 | Day et al. |
| 6,002,394 | A | 12/1999 | Schein et al. |
| 6,005,561 | A | 12/1999 | Hawkins et al. |
| 6,008,083 | A | 12/1999 | Brabazon et al. |
| 6,008,803 | A | 12/1999 | Rowe et al. |
| 6,008,836 | A | 12/1999 | Bruck et al. |
| 6,016,144 | A | 1/2000 | Blonstein et al. |
| 6,025,837 | A | 2/2000 | Matthews, III et al. |
| 6,038,560 | A | 3/2000 | Wical |
| 6,049,823 | A | 4/2000 | Hwang |
| 6,061,695 | A | 5/2000 | Slivka et al. |
| 6,061,719 | A | 5/2000 | Bendinelli et al. |
| 6,067,108 | A | 5/2000 | Yokote et al. |
| 6,088,722 | A | 7/2000 | Herz et al. |
| 6,091,411 | A | 7/2000 | Straub et al. |
| 6,094,237 | A | 7/2000 | Hashimoto |
| 6,141,003 | A | 10/2000 | Chor et al. |
| 6,148,081 | A | 11/2000 | Szymanski et al. |
| 6,162,697 | A | 12/2000 | Singh et al. |
| 6,169,543 | B1 | 1/2001 | Wehmeyer |
| 6,172,677 | B1 | 1/2001 | Stautner et al. |
| 6,177,931 | B1 | 1/2001 | Alexander et al. |
| 6,191,781 | B1 | 2/2001 | Chaney et al. |
| 6,195,692 | B1 | 2/2001 | Hsu |
| 6,205,582 | B1 | 3/2001 | Hoarty |
| 6,219,839 | B1 | 4/2001 | Sampsell |
| 6,239,795 | B1 | 5/2001 | Ulrich et al. |
| 6,240,555 | B1 | 5/2001 | Shoff et al. |
| 6,281,940 | B1 | 8/2001 | Sciammarella |
| 6,292,187 | B1 | 9/2001 | Gibbs et al. |
| 6,292,827 | B1 | 9/2001 | Raz |
| 6,295,057 | B1 | 9/2001 | Rosin et al. |
| 6,314,569 | B1 | 11/2001 | Chernock et al. |
| 6,317,885 | B1 | 11/2001 | Fries |
| 6,345,305 | B1 | 2/2002 | Beck et al. |
| 6,405,239 | B1 | 6/2002 | Addington et al. |
| 6,415,438 | B1 | 7/2002 | Blackketter et al. |
| 6,421,067 | B1 | 7/2002 | Kamen et al. |
| 6,426,779 | B1 | 7/2002 | Noguchi et al. |
| 6,442,755 | B1 | 8/2002 | Lemmons et al. |
| 6,477,705 | B1 | 11/2002 | Yuen et al. |
| 6,486,920 | B2 | 11/2002 | Arai et al. |
| 6,522,342 | B1 | 2/2003 | Gagnon et al. |
| 6,529,950 | B1 | 3/2003 | Lumelsky et al. |
| 6,530,082 | B1 | 3/2003 | Del Sesto et al. |
| 6,532,589 | B1 | 3/2003 | Proehl et al. |
| 6,564,263 | B1 | 5/2003 | Bergman et al. |
| 6,567,104 | B1 | 5/2003 | Andrew et al. |
| 6,571,392 | B1 | 5/2003 | Zigmond et al. |
| 6,591,292 | B1 | 7/2003 | Morrison et al. |
| 6,621,509 | B1 | 9/2003 | Eiref et al. |
| 6,636,887 | B1 | 10/2003 | Augeri |
| 6,658,661 | B1 | 12/2003 | Arsenault et al. |
| 6,678,891 | B1 | 1/2004 | Wilcox et al. |
| 6,684,400 | B1 | 1/2004 | Goode et al. |
| 6,694,312 | B2 | 2/2004 | Kobayashi et al. |
| 6,698,020 | B1 | 2/2004 | Zigmond et al. |
| 6,704,359 | B1 | 3/2004 | Bayrakeri et al. |
| 6,731,310 | B2 | 5/2004 | Craycroft et al. |
| 6,745,367 | B1 | 6/2004 | Bates et al. |
| 6,760,043 | B2 | 7/2004 | Markel |
| 6,763,522 | B1 | 7/2004 | Kondo et al. |
| 6,766,526 | B1 | 7/2004 | Ellis |
| 6,806,887 | B2 | 10/2004 | Chernock et al. |
| 6,857,128 | B1 | 2/2005 | Borden, IV et al. |
| 6,886,029 | B1 | 4/2005 | Pecus et al. |
| 6,904,610 | B1 | 6/2005 | Bayrakeri et al. |
| 6,910,191 | B2 | 6/2005 | Segerberg et al. |
| 6,918,131 | B1 | 7/2005 | Rautila et al. |
| 6,963,880 | B1 | 11/2005 | Pingte et al. |

(56) References Cited

U.S. PATENT DOCUMENTS

| | | |
|---|---|---|
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 * | 11/2007 | Krieger ............... H04N 21/4316 725/40 |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,185,523 B2 | 5/2012 | Lu et al. |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,434,109 B2 | 4/2013 | Kamimaeda et al. |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,154,824 B2 | 10/2015 | Wiser et al. |
| 9,173,001 B1 | 10/2015 | Roberts et al. |
| 9,363,560 B2 | 6/2016 | Moreau et al. |
| 9,473,548 B1 | 10/2016 | Chakrovorthy et al. |
| 9,516,253 B2 | 12/2016 | De Andrade et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0104083 A1 | 8/2002 | Hendricks et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0124256 A1 | 9/2002 | Suzuka |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0147984 A1 | 10/2002 | Tomsen et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0023975 A1 | 1/2003 | Schrader et al. |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |

(56) References Cited

U.S. PATENT DOCUMENTS

| | | |
|---|---|---|
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1* | 11/2004 | Farcasiu ............ H04M 1/72412 455/557 |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0166230 A1 | 7/2005 | Gaydou et al. |
| 2005/0204385 A1 | 9/2005 | Sull et al. |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0105793 A1 | 5/2006 | Gutowski et al. |
| 2006/0125962 A1 | 6/2006 | Shelton et al. |
| 2006/0143191 A1 | 6/2006 | Cho et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2006/0253874 A1* | 11/2006 | Stark ................ H04N 21/41265 725/62 |
| 2007/0019001 A1 | 1/2007 | Ha |
| 2007/0050343 A1 | 3/2007 | Siddarampappa et al. |
| 2007/0064715 A1 | 3/2007 | Lloyd et al. |
| 2007/0083538 A1 | 4/2007 | Roy et al. |
| 2007/0106659 A1 | 5/2007 | Lu et al. |
| 2007/0112761 A1 | 5/2007 | Xu et al. |
| 2007/0157247 A1 | 7/2007 | Cordray et al. |
| 2007/0168867 A1 | 7/2007 | Hiroi et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0082921 A1 | 4/2008 | Negi |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301320 A1 | 12/2008 | Morris |
| 2008/0301732 A1 | 12/2008 | Archer et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0187578 A1* | 7/2009 | Morita ................ G06F 16/4387 |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |

(56) References Cited

U.S. PATENT DOCUMENTS

| | | |
|---|---|---|
| 2011/0055282 A1 | 3/2011 | Hoving |
| 2011/0058101 A1 | 3/2011 | Earley et al. |
| 2011/0083111 A1* | 4/2011 | Forutanpour ............ H04W 4/21 |
| | | 715/863 |
| 2011/0087348 A1 | 4/2011 | Wong |
| 2011/0091183 A1* | 4/2011 | Nakamura ......... H04N 21/4122 |
| | | 386/230 |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2011/0289098 A1 | 11/2011 | Oztaskent et al. |
| 2012/0002111 A1 | 1/2012 | Sandoval et al. |
| 2012/0011550 A1 | 1/2012 | Holland |
| 2012/0054811 A1 | 3/2012 | Spears |
| 2012/0066602 A1* | 3/2012 | Chai ...................... H04L 65/403 |
| | | 715/733 |
| 2012/0117151 A1 | 5/2012 | Bill |
| 2012/0185905 A1* | 7/2012 | Kelley ............... H04N 21/8153 |
| | | 348/E9.055 |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0254793 A1* | 10/2012 | Briand ............. H04N 21/43615 |
| | | 715/781 |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1* | 12/2012 | Matthews, III .... H04N 21/4882 |
| | | 725/14 |
| 2012/0324518 A1 | 12/2012 | Thomas et al. |
| 2013/0007043 A1 | 1/2013 | Phillips |
| 2013/0014155 A1 | 1/2013 | Clarke et al. |
| 2013/0040623 A1* | 2/2013 | Chun ................. H04N 21/4316 |
| | | 455/414.2 |
| 2013/0051770 A1 | 2/2013 | Sargent |
| 2013/0103446 A1* | 4/2013 | Bragdon ............... G06F 3/0488 |
| | | 705/7.15 |
| 2013/0110769 A1* | 5/2013 | Ito ......................... G06Q 10/10 |
| | | 707/E17.005 |
| 2013/0111514 A1 | 5/2013 | Slavin et al. |
| 2013/0170813 A1* | 7/2013 | Woods ................. H04N 21/478 |
| | | 386/E5.002 |
| 2013/0176493 A1* | 7/2013 | Khosla ............... H04N 21/4122 |
| | | 348/563 |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0310063 A1* | 11/2013 | Joy ......................... H04W 4/21 |
| | | 455/456.1 |
| 2013/0316716 A1 | 11/2013 | Tapia et al. |
| 2013/0326340 A1* | 12/2013 | Woo ................... H04M 1/72403 |
| | | 715/243 |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0332855 A1* | 12/2013 | Roman ................ G06F 3/04842 |
| | | 715/753 |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0026068 A1* | 1/2014 | Park ..................... G06F 3/0482 |
| | | 715/748 |
| 2014/0032473 A1 | 1/2014 | Enoki et al. |
| 2014/0053078 A1* | 2/2014 | Kannan ................... H04W 4/21 |
| | | 715/748 |
| 2014/0057557 A1* | 2/2014 | Hadizad .................. H04W 8/22 |
| | | 455/67.11 |
| 2014/0068648 A1 | 3/2014 | Green et al. |
| 2014/0075465 A1* | 3/2014 | Petrovic ............... H04N 21/658 |
| | | 725/14 |
| 2014/0082519 A1* | 3/2014 | Wang ................. H04M 1/72403 |
| | | 715/748 |
| 2014/0087654 A1* | 3/2014 | Kiveisha ................... H04B 5/72 |
| | | 455/41.1 |
| 2014/0089423 A1* | 3/2014 | Jackels ............... H04N 21/8133 |
| | | 709/206 |
| 2014/0089967 A1* | 3/2014 | Mandalia ............ H04N 21/235 |
| | | 725/34 |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1* | 10/2014 | Vehovsky ................. H04N 5/76 |
| | | 715/723 |
| 2014/0327677 A1* | 11/2014 | Walker .................. H04L 65/403 |
| | | 345/440 |
| 2014/0334381 A1* | 11/2014 | Subramaniam .... H04N 21/4344 |
| | | 370/328 |
| 2014/0359662 A1 | 12/2014 | Packard et al. |
| 2014/0365302 A1* | 12/2014 | Walker ............... H04N 21/4788 |
| | | 705/14.53 |
| 2014/0373032 A1 | 12/2014 | Merry et al. |
| 2015/0020096 A1* | 1/2015 | Walker ............... G06Q 30/0255 |
| | | 725/34 |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 2000011869 A1 | 3/2000 |
| WO | 0033576 A1 | 6/2000 |
| WO | 0110115 A1 | 2/2001 |
| WO | 0182613 A1 | 11/2001 |
| WO | 2001084830 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

Michael Adams, "Open Cable Architecture", Cisco Press, Dec. 3, 1999.

Andreas Kraft and Klaus Hofrichter, "An Approach for Script-Based Broadcast Application Production", Springer-Verlag Berlin Heidelberg, pp. 74-82, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

(56) References Cited

OTHER PUBLICATIONS

Shim, et al., "A SMIL Based Graphical Interface for Interactive TV", Internet Tech. Laboratory Dept. of Comp. Engineering, San Jose State University, pp. 257-266, 2003.

Yoon, et al., "Video Gadget: MPET-7 Based Audio-Visual Content Indexing and Browsing Engine", LG Electronics Institute of Technology, 2001, pp. 59-68.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

Li, Y et al. "Reliable Video Clock Time Recognition", Pattern Recognition, 2006, ICPR 1006, 18th International Conference on Pattern Recognition, 4 pages.

Salton et al., Computer Evaluation of Indexing and Text Processing Journal of the Association for Computing Machinery, vol. 15, No. 1, Jan. 1968, pp. 8-36.

Smith, J.R. et al., An Image and Video Search Engine for the World-Wide Web Storage and Retrieval for Image and Video Databases 5, San Jose, Feb. 13-14, 1997, Proceedings of Spie, Bellingham, Spie, US, vol. 3022, Feb. 13, 1997, pp. 84-95.

Messer, Alan et al., "SeeNSearch: A context Directed Search Facilitator for Home Entertainment Devices", Paper, Samsung Information Systems America Inc., San Jose, CA, 2008.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

Steffan Staab et al., "Semantic Multimedia", Reasoning Web; Lecture Notes in Computer Science, pp. 125-170, Sep. 2008.

Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.

Agnieszka Zagozdzinnska et al. "TRIDAQ Systems in HEP Experiments at LHC Accelerator" Kwartalnik Elektroniki I Telekomunikacji, vol. 59, No. 4, Oct. 2013.

Kontothoanassis, Ledonias et al., "Design, Implementation, and Analysis of a Multimedia Indexing and Delivery Server", Technical Report Series, Aug. 1999, Cambridge Research Laboratory.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Oct. 31, 2022—CA Office Action—CA App. No. 2,832,800.

* cited by examiner

PROVIDING SUPPLEMENTAL CONTENT FOR A SECOND SCREEN EXPERIENCE

CROSS-REFERENCE TO RELATED APPLICATIONS

This application is a continuation of U.S. application Ser. No. 13/803,274, filed Mar. 14, 2013, the disclosure of which is incorporated by reference herein in its entirety.

BACKGROUND

Television viewing is no longer the static, isolated, passive pastime that it used to be. Today, viewers have the option of using a computing device, such as a tablet computer, to view a webpage related to a show they are watching, thereby keeping the viewers engaged in a particular program. However, there are many other webpages, and there is a demand for new and interesting ways to keep the viewer engaged with the webpage that is related to the particular program.

SUMMARY

Some or all of the various features described herein may facilitate discovery, organization, and presentation of supplemental content (e.g., second screen content, or same device companion content) on a second user device (e.g., a second screen device such as a tablet computer, smartphone, laptop, etc.) or a first user device (e.g., a first screen device such as a television or video display) to complement primary content displayed on a first user device thereby providing a desirable second screen, or augmented first screen, experience.

In accordance with aspects of the disclosure, an item detection system is provided for supplying appropriate items, such as computer applications, Internet pages, and other interactive content, based on context information regarding a user's current activity. The detected items may be supplied to various user devices for presentation in a variety of screens. For example, the items may be presented in an interface, e.g., a program guide, or other screens accessible through a first screen device, such as a television, or second screen device, such as a tablet. The item detection system, therefore, may provide a means through which users may discover items related to content they are consuming. Additional features of the item detection system with respect to how context information is obtained, how items are detected, how detected items are arranged, how detected items are presented, and how detected items may be downloaded and/or launched are also taught in this disclosure.

Further, other aspects of the disclosure include a supplemental content presentation application and a system for supporting said application. In an illustrative embodiment, this application may include a timeline of events relating to a program, such as a video program. The system may provide this timeline to said application running on a user device, such as a tablet computer, which may present the timeline on a screen for a user to view. The timeline may be utilized to synchronize supplemental content with primary content so that, as the primary content is presented to the user on the same user device or a different one, corresponding supplemental content may be presented on the user device. Users may also interact with the timeline to select points along the timeline, which are associated with portions of the primary content, and access supplemental content corresponding to those points.

The system may receive and/or provide updates to the timeline from an administrative entity and may generate instructions, including supplemental content, that cause the user device to modify the timeline to present the supplemental content at a point along the timeline. Modifying the timeline may include adding a marker on the timeline. Users may also modify the timeline by performing various actions that may cause other markers to be added to the timeline. Further, the system may receive data feeds from social network services and other news sources. The data feeds may include messages that the system may deliver to a user device. A user of the user device may select one of the messages, thereby causing a marker to be added to the timeline. The selection may also create a report that is sent to the system. Based on a number of reports, the system may determine whether a marker should be added to the timeline so that a message may be featured for other users to consume.

Additionally, aspects of the present disclosure teach computing devices, having a processor and memory storing computer-executable instructions, and other apparatuses to perform the above steps and other steps for discovering items and improving a second screen experience.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

By way of introduction, the various features described herein may allow a user to discover an item, such as a supplemental content presentation application, and download that item to a second screen device (e.g., a tablet), or interact with that content on a first screen (e.g. Television or other device presenting audio or video content). If the supplemental content presentation application is downloaded, the second screen device may present supplemental content to a user while the user is consuming primary content on a first screen device (e.g., a television). If the supplemental content presentation application is used on the first screen device then the supplemental content may be presented to a user while the user is consuming primary content on a first screen device in one of many modes, in which, e.g., interactive content overlays video content, or interactive content is presented beside or around video content. A companion content experience (also referred to as a second screen experience), in which supplemental content may be presented on a first screen device or second screen device, may be enhanced by various features of the supplemental content presentation application, such as a timeline that users may interact with and modify.

Figure 1:
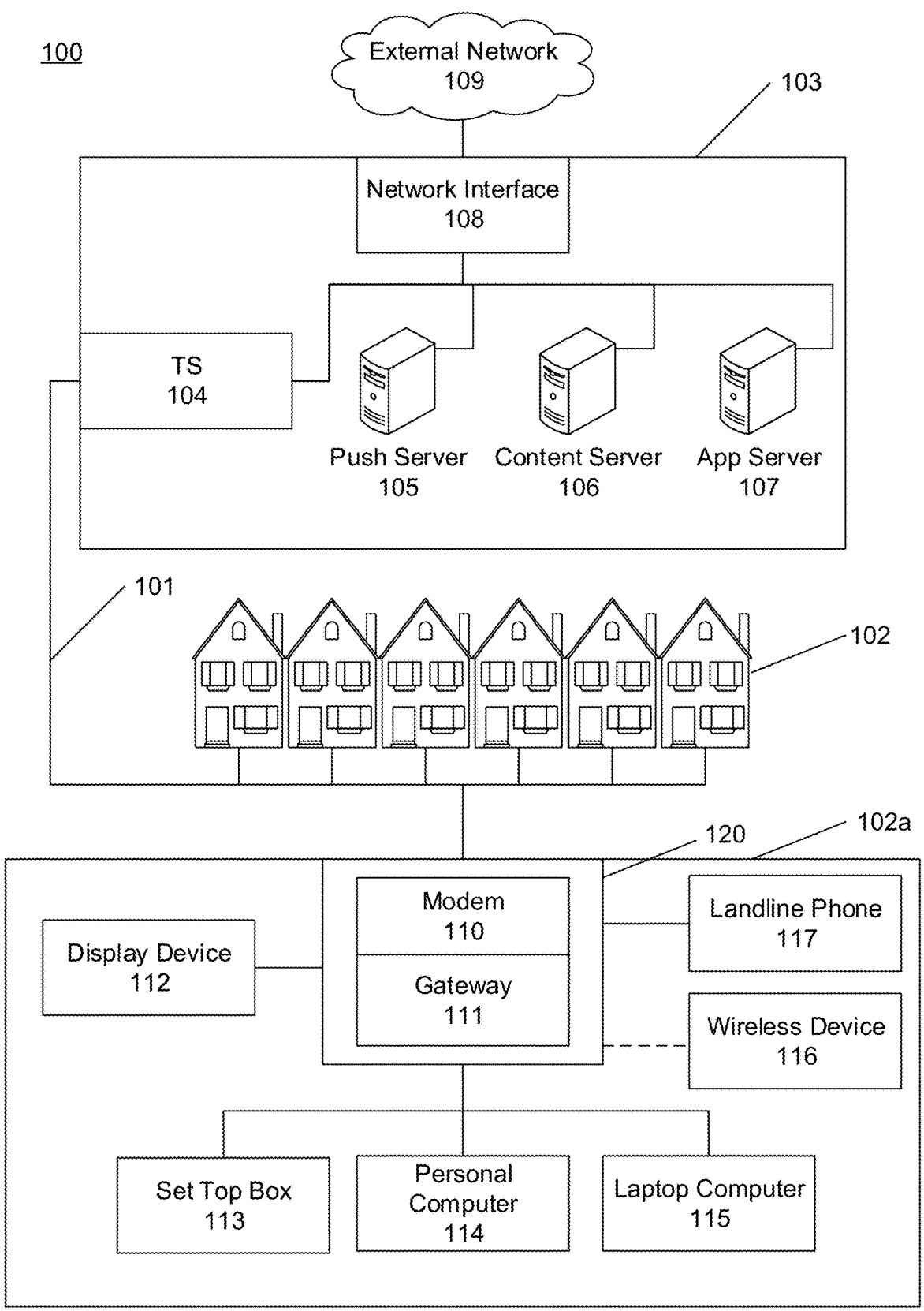
FIG. 1 illustrates an example communication network on which various features described herein may be used.

FIG. 1 illustrates an example communication network 100 on which many of the various features described herein, such as the requesting and retrieval of primary content, items related to the primary content, and supplemental content may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103, which can be a data processing facility, may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, such as information for identifying a user or second screen device.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102*a*, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
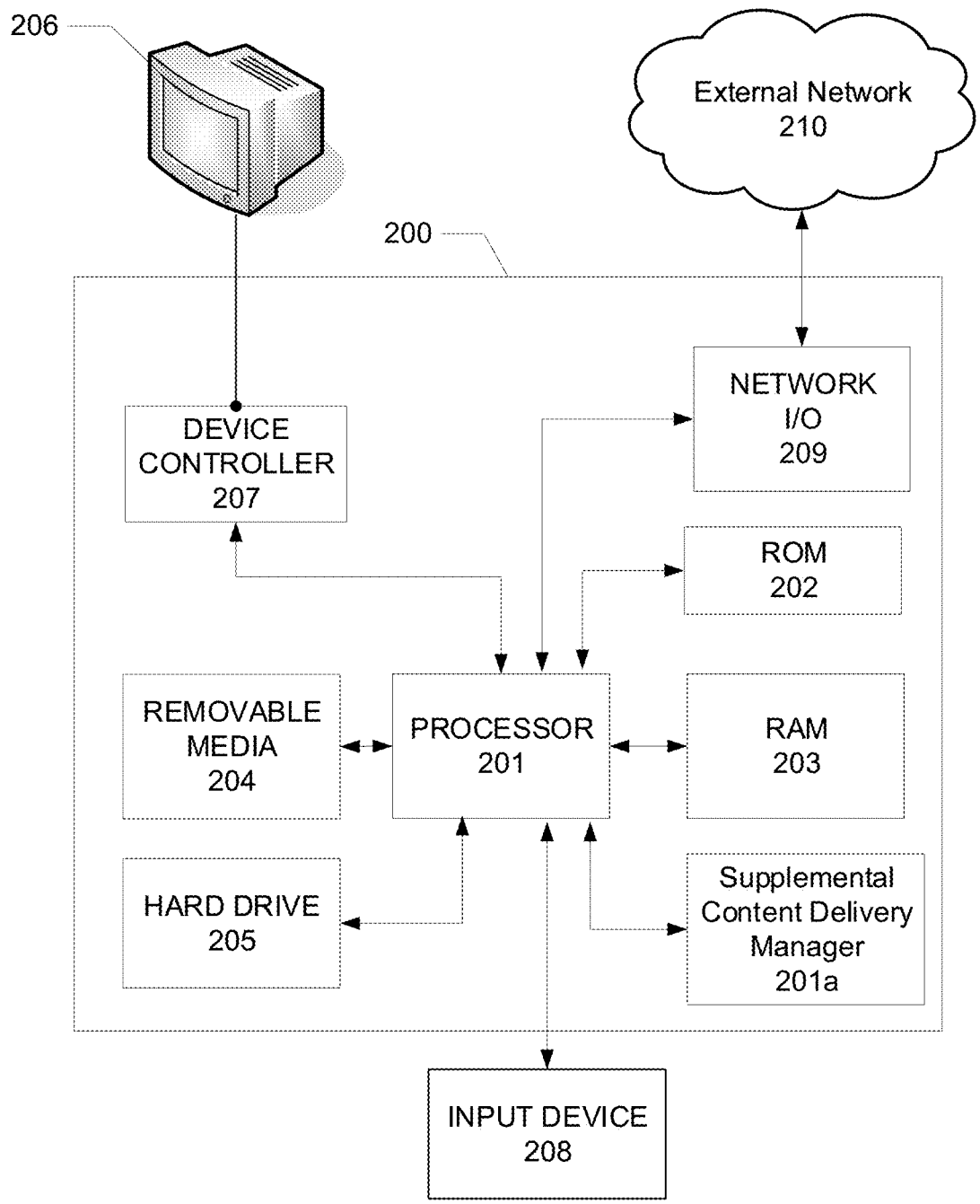
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, the computing device 200 may include a supplemental content delivery manager 201*a*, which can perform the various methods for discovering, organizing, and presenting supplemental content described herein, as a replacement for, or augment to, any other processor 201 that the computing device 200 may include. That is, the supplemental content delivery manager 201*a* may include a separate processor and/or set of computer-executable instructions stored on a computer-readable medium that, when executed by a processor, cause the processor (or the computing device 200 as a whole) to perform the various methods of the present disclosure, such as discovering supplemental content and presenting a timeline. The supplemental content delivery manager 201*a* may also include secure memory (not shown), which can store the various user preferences, user profile information, and algorithms described herein. The secure memory can be any desired type of memory, and can have enhanced security features to help restrict access (e.g., can only be accessed by the supplemental content delivery manager 201*a*, can be internal to the supplemental content delivery manager 201*a*, etc.). Where the supplemental content delivery manager 201*a* includes a separate set of computer-executable instructions, these instructions may be secured such that only authorized users may be allowed to modify, augment, or delete them.

In some embodiments, the supplemental content delivery manager 201*a* may be implemented as an application specific integrated circuit (ASIC). That is, the supplemental content delivery manager 201*a* may be a chip designed specifically for performing the various processes described herein. Further, the ASIC may be implemented within or in communication with various computing devices provided herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
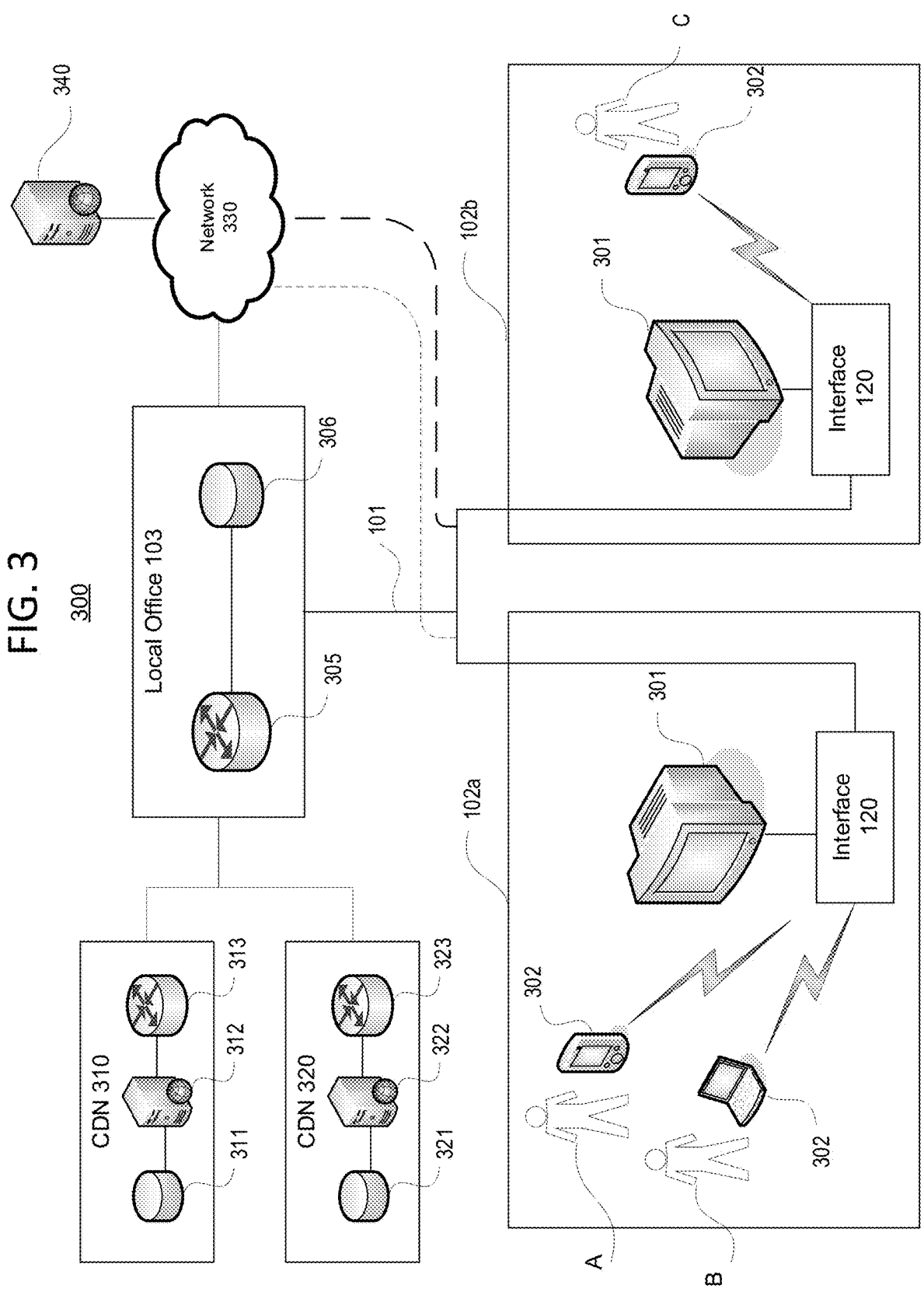
FIG. 3 illustrates a system architecture according to one or more aspects described herein.

FIG. 3 is a diagram showing an example system architecture 300 on which various features described herein may be performed. The system 300 of FIG. 3 depicts a local office 103, a first premises 102a, a second premises 102b, one or more content distribution networks (CDN) 310 and 320, a network 330, and a second screen experience manager (e.g., a computing device or server) 340. As shown in FIG. 1, the local office 103 may connect to the first premises 102a and second premises 102b via links 101. The first premises 102a may include an interface 120 (e.g., a gateway computing device, modem, digital video recorder, set top box, etc.), a first screen device 301 (e.g., a television, a monitor, a projector, etc.), and one or more second screen devices 302 (e.g., a smartphone, tablet, laptop, etc.). As shown in FIG. 3, multiple users A and B may be located at the first premises 102a and each user may operate a second screen device 302 while consuming primary content via the first screen device 301. Meanwhile, the second premises 102b may include an interface 120, a first screen device 301, and a second screen device 302 used by a user C. Primary content, such as video content, may be transmitted from the local office 103 to the interfaces 120 of the first and second premises 102a-b, and presented through the first screen devices 301. Thus, users A and B may consume primary content (e.g., view a television show, or a stream of a video program that is multicast according to a schedule, or transmitted on demand, or play back content that is locally recorded at the first screen device 301 or an associated device such as at a DVR) at the premises 102a and user C may consume primary content at the premises 102b. In addition to presenting primary content, the first screen device 301 may also present supplemental content (e.g., second screen content). Notably, the first screen device 301 may present a listing of items related to the primary content being displayed, and the user may request that one or more of the listed related items be downloaded to and executed on the first screen device 301 or a second screen device 302 at the same premises 102.

Also, while consuming primary content, each user may operate a respective second screen device 302 to consume supplemental content (e.g., second screen content) related to the primary content presented on the first screen device 301 at their premises 102. For example, user A may operate a second screen device 302, such as a smartphone, to consume second screen content, such as a poll through which user A may vote for a contestant shown in the primary content presented on the first screen device 301. The second screen content may be any data that provides information or content to supplement primary content, which may be the video content (e.g., linear television program, on-demand movie, etc.) presented on a first screen device 301. For example, second screen content may include a link to a webpage of a product shown in an advertisement of the primary content, a video clip with bonus features, text and/or images with information about the content itself or about individuals or items shown in the primary content, advertisements, coupons, questions pertaining to the primary content, etc. In some embodiments, the various second screen content may be generated from ordinary everyday consumers of the primary content, such as viewer reviews of a video program, chat room discussions, of a movie, etc. In some embodiments, the second screen content may be from formal primary content sources, such as the same source that provided the primary content (e.g., a television company may provide both a television program as primary content, and a companion Internet page secondary content to accompany the display of the primary content). The appearance of the second screen content may be generated by the second screen device 302 using software that is previously stored, or it may be dynamically retrieved or received when it is desired, and the timing of when the second screen content appears (e.g., when a particular Internet link should appear, or when a particular image should be displayed) may be based on triggers (e.g., Enhanced Binary Interchange Format (EBIF) triggers) or signals that are received along with, or in addition to, the primary content stream. Triggers may also be generated by other methods such as, but not limited to, (1) by analyzing audio and or video signals to determine a position in a program (e.g., automated content recognition), or (2) by explicitly accessing the media time of a video asset. In both of these additional cases, the time within a program can be used to compare against a list of triggers for a program in order to identify an appropriate trigger. In any event, EBIF and/or time-based trigger files may be combined with contextual information to launch, or offer for launch, supplemental content.

Referring to FIG. 3, users may consume primary content at a premises 102a (e.g., a home, business, etc.). Consuming primary content may include, for example, watching and/or listening to a television program or internet video on a first screen device 301 (e.g., a television, computer monitor, projector, etc.). The first screen device 301 may receive the primary content from the interface 120, which is connected to the local office 103 and configured to accept the primary content. FIG. 3 also illustrates some examples of second screen devices 302, namely a smartphone and a laptop computer. Each second screen device 302 may be configured to store and/or execute a supplemental content presentation application (e.g., a computer program) through which a user may select and consume second screen content. This application may be downloaded from the local office 103 or another computing device 200 on the network 330, or retrieved from a computer readable medium (e.g., compact disc (CD), flash drive, etc.). The supplemental content presentation application may also be a web browser for navigating to a website that provides the second screen experience described herein. Although FIG. 3 shows some example second screen devices 302, many other devices may be used as second screen devices 302. Indeed, even another television (or the same television), similar in configuration to a first screen device 301, may be used as the second screen device 302. The second screen device 302 may also be a specially designed device (e.g., an enhanced television remote) for specific use in the embodiments disclosed herein.

Further, each of the second screen devices 302 may be configured to bi-directionally communicate via a wired and/or wireless connection with the second screen experience manager 340 via the network 330. Specifically, the second screen devices 302 may be configured to access the network 330 (e.g., the Internet) to obtain second screen content and to transmit/receive signals via the network 330 to/from the second screen experience manager 340. For example, a second screen device 302 may transmit information, such as requests for second screen content, through a wired connection, including the links 101 through which the primary content is supplied to a first screen device 301, to the local office 103 which then routes the transmission to the network 330 so that it may eventually reach the second screen experience manager 340. That is, the second screen device 302 may connect to the interface 120 and communicate with the second screen experience manager 340 over the links 101 used to transmit the primary content downstream. Alternatively, a second screen device 302 may wirelessly communicate via, for example, a WiFi connection and/or cellular backhaul, to connect to the network 330 (e.g., the Internet) and ultimately to the second screen experience manager 340. Accordingly, although not shown, the network 330 may include cell towers and/or wireless routers for communicating with the second screen devices 302.

Although FIG. 3 depicts the second screen experience manager 340 as being separate from the local office 103, in some embodiments, the second screen experience manager 340 may be located at the local office 103. In such embodiments, the second screen devices 302 may still access the second screen experience manager 340 through the network 330. Further, even though the second screen experience manager 340 is shown as a single element, in some embodiments, it may include a number of computing devices 200, which may include the supplemental content delivery manager 201*a*. The second screen experience manager 340, like other computing devices 200, may include a processor and memory storing computer-executable instructions that, when executed, cause the processor to perform a variety of functions recited herein, such as providing a timeline.

Still referring to FIG. 3, the local office 103 may include a router 305, and a database 306 for storing user information (e.g., user profiles), primary content, second screen content, and/or computer-executable instructions for providing supplemental content or performing any of the steps described herein. The router 305 of the local office 103 may forward requests for content from users and/or user devices (e.g., first screen devices 301, second screen devices 302, etc.) to one or more CDNs 310 and 320 and/or the second screen experience manager 340 that may supply the requested content and/or timeline information. Each of the CDNs 310 and 320 may include one or more routers 311 and 321, whose purpose is to receive requests from users (e.g., via their local offices) and route them to servers within its network that may store the requested content and be able to supply it in response to the request. A CDN 310 for a given piece of content might have a hierarchy of one primary source, and a plurality of lower-level servers that can store (e.g., cache) the content and respond to requests. The lower-level servers that ultimately service the request may be referred to as edge servers, such as one or more edge servers 312 and 322. The various servers may include one or more content databases 313 and 323, which store content that the respective CDN 310 and 320 manages. In some embodiments, the CDNs 310 and 320 may provide the same or similar content. In other embodiments, the CDNs 310 and 320 may offer different content from one another. Also, the CDNs 310 and 320 may be maintained/operated by the same or different content providers. Although only two CDNs 310 and 320 are shown, many CDNs may be included in the system architecture 300 of FIG. 3.

Figure 4A:
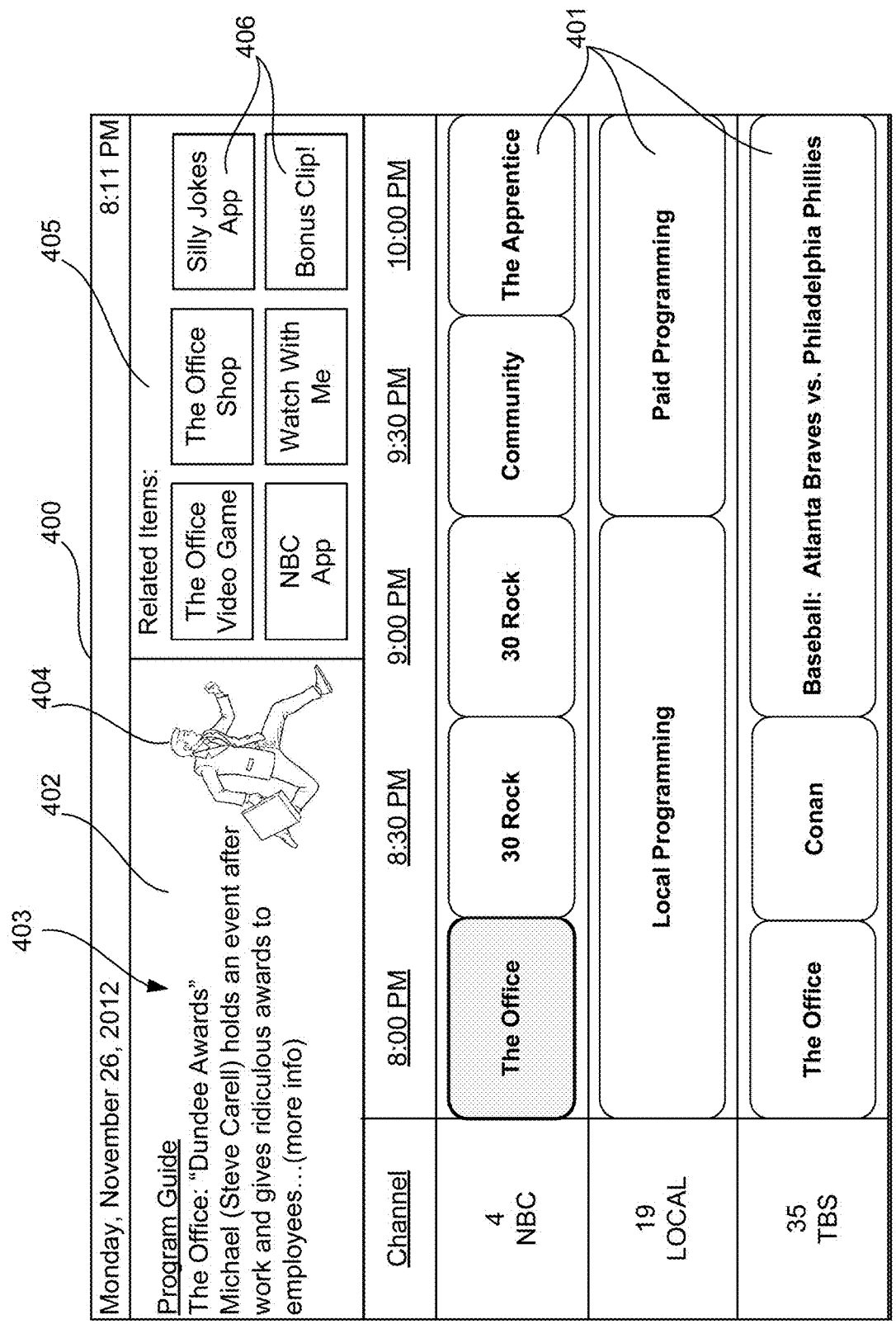
FIGS. 4A-4H are diagrams illustrating example user experience interfaces.

FIG. 4A is a diagram illustrating an aspect of the present disclosure. Specifically, FIG. 4A illustrates a program guide 400, such as an electronic program guide (EPG). This program guide 400 may be provided by the local office 103 or another computing device (e.g., the second screen experience manager 340). The program guide 400 provides a listing of content that may be presented on a first screen device 301 or second screen device 302. As shown in FIG. 4A, the listing includes a plurality of content options 401 and may be organized in a grid where logical channel numbers are ordered vertically and the content on those channels are ordered according to time in the horizontal direction. The program guide 400 may be accessed and navigated using a second screen device 302 or separate remote control. For example, a user may press a "guide" button on a second screen device 302 or remote control to display the program guide 400 on a first screen device 301, and then press directional arrow buttons (e.g., up, down, left, and/or right buttons) to navigate throughout the program guide 400. FIG. 4A shows a scenario in which "The Office" option 401 is temporarily selected. As shown, a content option 401 may appear shaded, highlighted, etc. when temporarily selected so that a user can realize where he/she is navigating to throughout the program guide 400.

When an option is selected, content information 403 related to the content associated with that option may be displayed in a preview frame 402. In the case of FIG. 4A where "The Office" is selected, the content information 403 may provide details regarding the content that may be viewed, such as a description of the content, a title of the content (e.g., "Dundee Awards"), information regarding actors/actresses in the content, etc. The preview frame 402 may also include a content sample 404, such as an image and/or video associated with the content.

Additionally, the program guide 400 may include a discovery frame 405. The discovery frame 405 may include other items 406 related to the selected content. Examples of related items 406 may include media (e.g., audio, video, audio/video content), links (e.g., URLs), applications (or computer programs), advertisements, and the like. As shown in FIG. 4A, when "The Office" is selected, the discovery frame 405 may include a file having code for rendering a video game with a video game system (e.g., Xbox) or an application for playing a video game related to "The Office" ("The Office Video Game"), a link to a website where merchandise related to "The Office" may be purchased ("The Office Shop"), an application for a content provider related to "The Office" ("NBC App"), and an application for presenting supplemental content related to "The Office" ("Watch With Me"). Notably, some items (e.g., the "Watch With Me" item) may provide supplemental content to be consumed in synchronization with the primary content, while other items might not be for synchronous consumption with the primary content (e.g., "The Office Video Game" may be played after an episode of "The Office" is over). Items appearing in the discovery frame 405 may also be related to a sponsor of a program and not specifically to the content itself. For example, Coca Cola™ may sponsor an episode of "The Office," and thus, a Coca Cola™ application may appear in the discovery frame 405 as related to "The Office." Each of these items may be represented with an icon, which may include an image, video, text, etc. and may be selectable (e.g., may include a link). Herein, the term "items" is used to denote the icons and/or the content, links, applications, code, etc. that they represent. Additional details regarding how items 406 are chosen for presentation in the discovery frame 405 are provided below with respect to FIGS. 6 and 7.

While a particular piece of content is selected, e.g., "The Office," a user may choose one of the related items 406 in the discovery frame 405. The items 406 in the discovery frame 405 may automatically change as a user navigates to other options 401 within the program guide 400 so that the items 406 in the discovery frame 405 correspond to the selected option 401. That is, the discovery frame 405 may be populated and continuously, or intermittently, updated with items 406 identified by an item detection system described in more detail below. In this manner, a user may discover one or more items 406 available for a particular piece of content.

Moreover, a user may navigate the discovery frame 405 to select the items 406 shown. While an item 406 is selected, a user may choose to download the selected item 406 (e.g., receive and store an executable file of the selected item 406). The item 406 may be downloaded to an interface 120 (e.g., a set top box), a media center coupled to the interface 120, a first screen device 301, or a second screen device 302. In some examples, the item 406 may first be downloaded to an interface 120 and then forwarded to the second screen device 302 of the user who made the selection to download and/or to other second screen devices 302 in communication with the interface 120.

In some cases, one or more items 406 may have already been downloaded to, e.g., an interface 120 or media center coupled thereto. In such cases, while an item 406 that has already been downloaded and cached is selected, a user may choose to launch the item 406 on a first or second screen device 301, 302. Accordingly, when an item 406 is first selected, a local computing device (e.g., the interface 120) may check to determine whether the item 406 has been downloaded already before requesting it to be downloaded. To support such an embodiment, the local computing device may include a local cache to store a list of already downloaded items and/or the items themselves. Also, where the item is a link or HTML element, selecting the item may trigger a first screen device 301 or second screen device 302 to launch a browser to view content associated with the link or HTML element.

In addition, the discovery frame 405 may include a search box (not shown) in which a user may insert keywords to find related items 406. Such a search box may be used to refine the search results in the discovery frame 405 or to conduct a new search for all available items 406. However, in some examples such a search box might not exist, and thus, a user may discover related items without searching but by navigating the program guide 400 instead. Further, although FIG. 4A illustrates that the items 406 may be presented within a discovery frame 405, the items 406 may be arranged anywhere within the program guide 400. For example, the items 406 may appear within the time/channel grid itself.

Figure 4B:
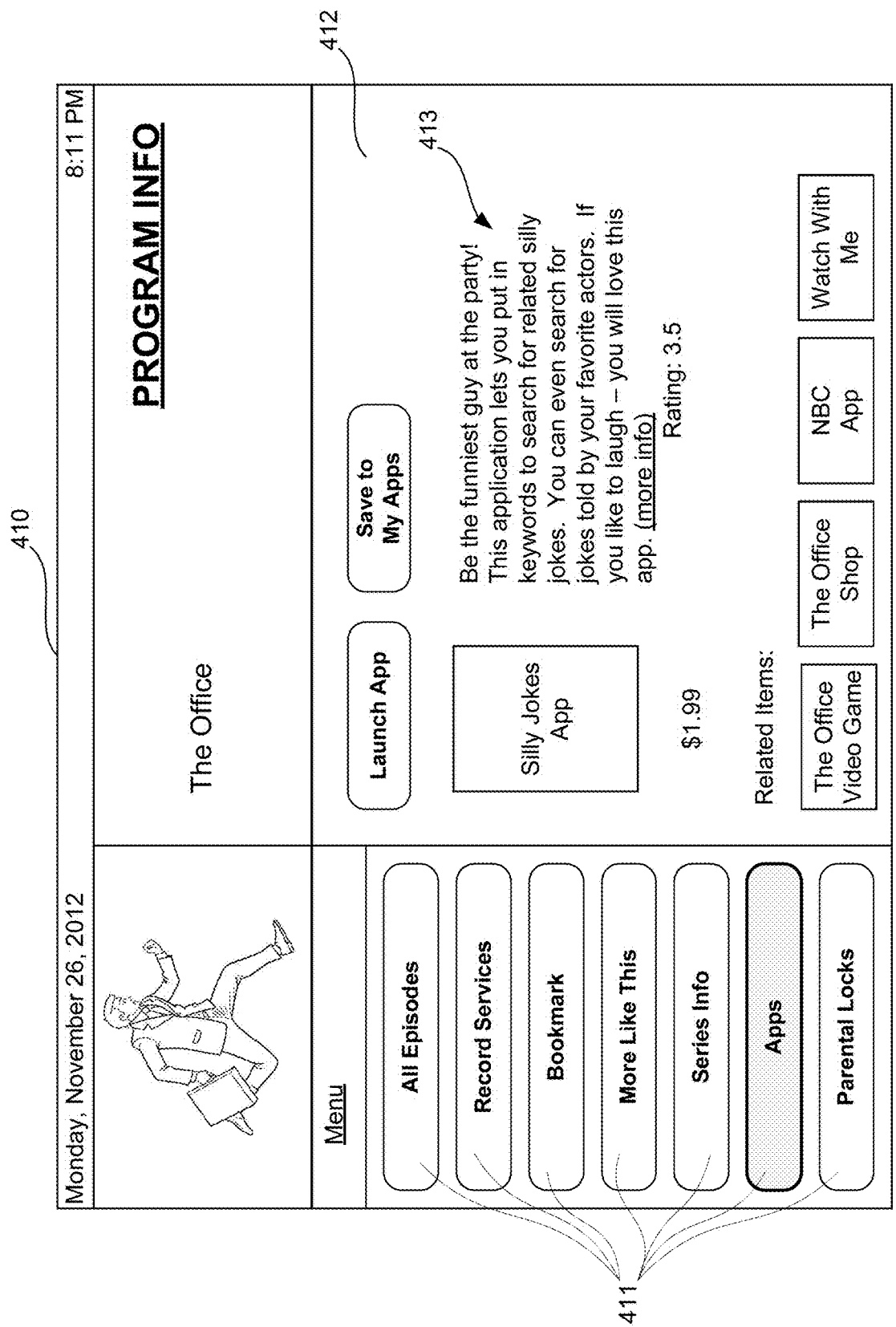

FIG. 4B is a diagram illustrating another aspect of the present disclosure. Specifically, FIG. 4B shows an example of a content information screen 410 (e.g., a program information screen). Herein, screens, such as the content information screen 410, may refer to the data used to render an image. The content information screen 410 may appear on a first screen device 301 or a second screen device 302 when a user chooses to view information for a particular piece of primary content (e.g., a television program). For example, a user may scroll over a particular program in the program guide 400 that the user is interested in and press an "info" button on a remote control device (or second screen device 302) to bring up the content information screen 410. As shown in FIG. 4B, the content information screen 410 may provide various information regarding "The Office" (an example television program) that a user may be interested in. The content information screen 410 may include a number of menu options 411 for controlling which type of information is viewed in a detailed information frame 412. As shown in FIG. 4B, the "Apps" menu option 411 may be selected, and therefore, the detailed information frame 412 may present items related to "The Office." One or more related items may be shown in the detailed information frame 412. One of the related items may include an application called "Silly Jokes App" that is detected as being related to "The Office." This item may have a higher rating, priority, and/or degree of relevance, and therefore, may appear larger than other items. The detailed information frame 412 may include a "Launch App" option and/or "Save to My Apps" option that allows a user to download and run/store an application, such as the "Silly Jokes App."

The detailed information frame 412 may also provide item description information 413. The item description information 413 may include a description of the item explaining features of the item, what platform the item is compatible with, how much memory is needed to download the item, how long it will take to download the item, how much the item costs, etc. The item description information 413 may also include a rating of one or more of the items and/or a preview of one or more of the items (e.g., a video clip showing features of the item). Further, the item description information 413 may also include a link to a page (e.g., a webpage) including more information if the item description information 413 does not fit within the detailed information frame 412 (see the "more info" link in FIG. 4B).

Figure 4C:
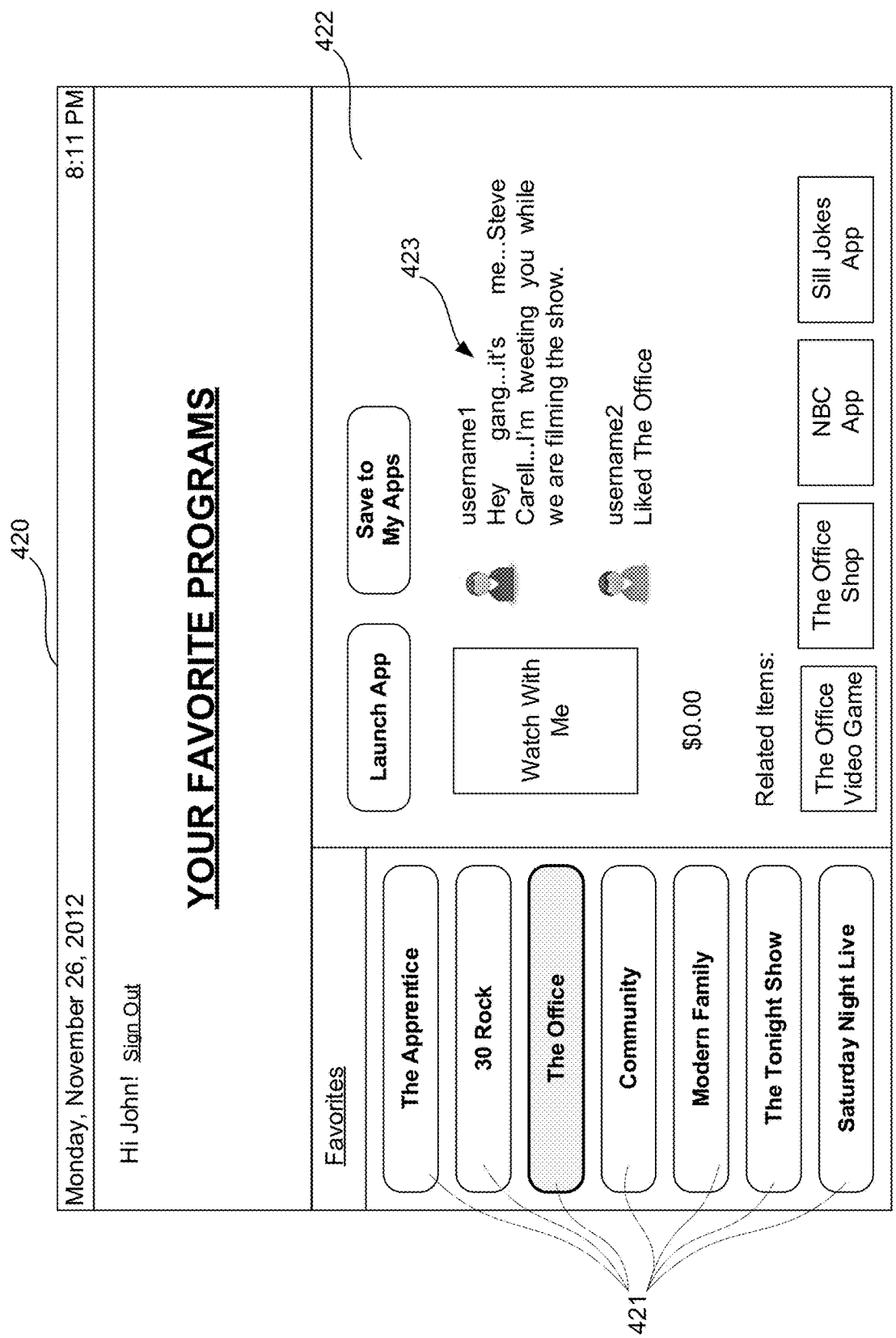

FIG. 4C is a diagram illustrating another aspect of the present disclosure. FIG. 4C shows a favorite program screen 420 that may provide a list of programs that a user identifies as a favorite. In some cases, the list of programs may also include recommendations of other programs based on the favorites of the user. The favorite program screen 420 may be presented on a first screen device 301 when, for example, a user presses a "favorites" button/key on a remote control for the first screen device 301 or selects a "favorites" option on a program guide 400. Or, the favorite program screen 420 may be presented on a second screen device 302 when, for example, a user runs a program installed on the second screen device 302 that enables a user to view favorite programs and other information regarding content. In some embodiments, when a "favorites" option of the first screen device 301 is selected, an associated second screen device 302 may present a listing of favorite program options. For example, referring to FIG. 3, the first screen device 301 or an interface 120 connected thereto (e.g., a set top box, digital video recorder, etc.) at the premises 102a may transmit a signal to user A's second screen device 302 and/or user B's second screen device 302, so that the second screen devices 302 may present the favorite program screen 420 of FIG. 4C. As shown in FIG. 4C, the list of programs may comprise one or more favorite program options 421. The user may select one of these favorite program options to view items related to the selected favorite program in a discovery frame 422 of the favorite program screen 420.

In the example of FIG. 4C, the discovery frame 422 may be similar to the detailed information frame 412 of FIG. 4B. However, the discovery frame 422 of FIG. 4C illustrates an example of item description information 423 for the "Watch With Me" application. As will be described in more detail below, the "Watch With Me" application may retrieve messages from various social network services. The device (e.g., the interface 120, first screen device 301, or second screen device 302) that controls the presentation of the discovery frame 422 may interface with the "Watch With Me" application to extract one or more of these messages to present them as examples within the discovery frame 422. For example, as shown in FIG. 4C, the item description information 423 may include a message from "username1" sent using TWITTER™ and a message from username2 sent using a different social network application, such as FACEBOOK™. Accordingly, in some cases, the discovery frame 422 may serve to present data from the data feeds that the "Watch With Me" application receives. For example, the discovery frame 422 may include RSS feeds or TWITTER™ messages transmitted from the "Watch With Me" application.

Figure 4D:
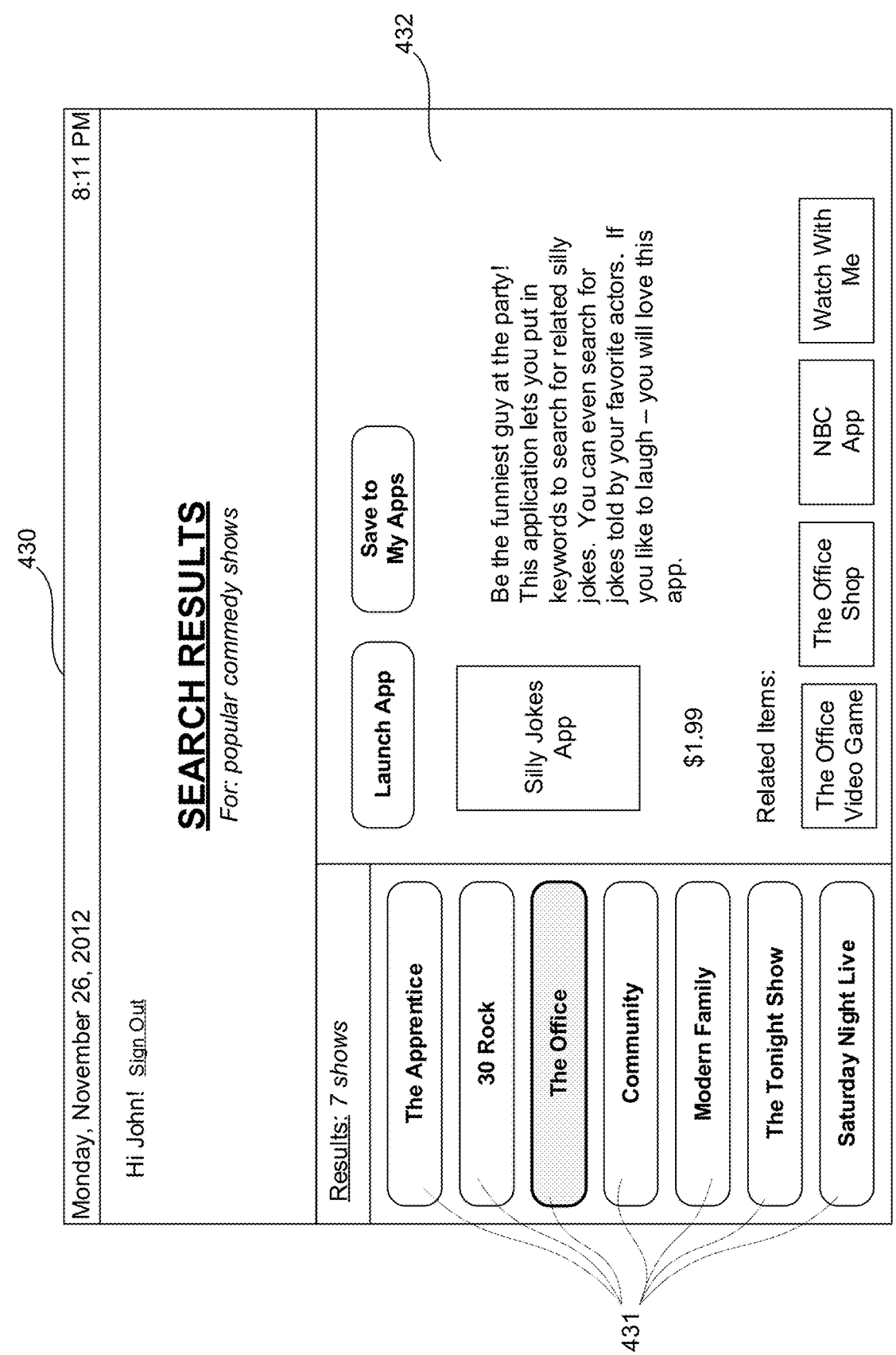

FIG. 4D is a diagram illustrating another aspect of the present disclosure. FIG. 4D shows a search results screen 430 for presenting results of a user's search for programs. A user may use a feature of the program guide 400 to search for programs using keywords or other information. In the example of FIG. 4D, a user has entered a search for "popular comedy shows," and the search results screen 430 is presenting a list of programs that match the search criteria. The search results screen 430 may include one or more result options 431 for each of the programs detected as a result of the search. When one of the result options 431 is selected, a discovery frame 432 may present items related to the particular result option 431. For example, in FIG. 4D, the result option 431 for "The Office" is selected, and therefore, the discovery frame 432 may present items related to "The Office" program. Here, the discovery frame 432 of FIG. 4D may be similar to the discovery frame 412 of FIG. 4B since both frames present items related to "The Office" program.

Instead of performing a search as described above, in some cases programs may be associated with a particular genre (e.g., science fiction, comedy, sports, movies, etc.), and a user may select a particular genre to view items related to that genre. Notably, the programs returned as a result of the search or selecting a genre may include linear content as well as non-linear content (e.g., content previously broadcasted or to be broadcasted in the future, on-demand content, etc.). Thus, one of skill in the art should appreciate that items related to non-linear content may also be discoverable using a system in accordance with this disclosure.

Figure 4E:

FIG. 4E is a diagram illustrating yet another aspect of the present disclosure. FIG. 4E shows a recorded content screen 440 presenting a list of content (e.g., programs) that a user has chosen to record. In addition, or alternatively, the list of content may include accessible Video on Demand assets (e.g., content recorded by a video aggregator and available for viewing). The recorded content may be recorded by a digital video recorder (DVR) or other computing device 200, or offered by Video on Demand server, so that a user can consume the content at a different time (e.g., a later time) than when the content is distributed by a content provider. When a user wishes to view a listing of his/her recorded content he/she may control a first screen device 301 or second screen device 302 to display the recorded content screen. While displaying the recorded content screen 440, a user may select one of the recorded content options 441. When a recorded content option 441 is selected, information about the recorded content (e.g., a description of the recorded content, a duration of the recorded content, etc.) may be displayed in a recorded content information frame 442. Additionally, when a recorded content option 441 is selected, items related to the recorded content option 441 may be presented in a discovery frame 443. As shown in FIG. 4E, the selected content option 441 includes "The Office" program, and therefore, the discovery frame 443 may present items related to "The Office" in a manner similar to the discovery frames 412 of FIG. 4B and 422 of FIG. 4C.

FIG. 4E also illustrates another feature of the present disclosure. The discovery frame 443 may present items related to events within the content itself. For example, if one of the characters in the particular episode of "The Office" that was recorded goes skydiving, an application, such as the "Skydiving App," may be included in the discovery frame 443. Also, if one of the characters in the particular episode of "The Office" that was recorded goes on a date, an application, such as the "Online Dating App," may be included in the discovery frame. From these two examples, it should be understood that various items that are relevant to the events within the primary content may exist. Further, in light of these examples, it should be realized that different pieces of similar primary content (e.g., different episodes of the same television program) may be associated with different related items. To realize these features, context information may be embedded in the audio feed and/or video feed (e.g., in different frames) of the primary content. Additional details regarding how items are chosen for presentation in the discovery frame 443 are provided below with respect to FIGS. 6 and 7.

Figure 4F:
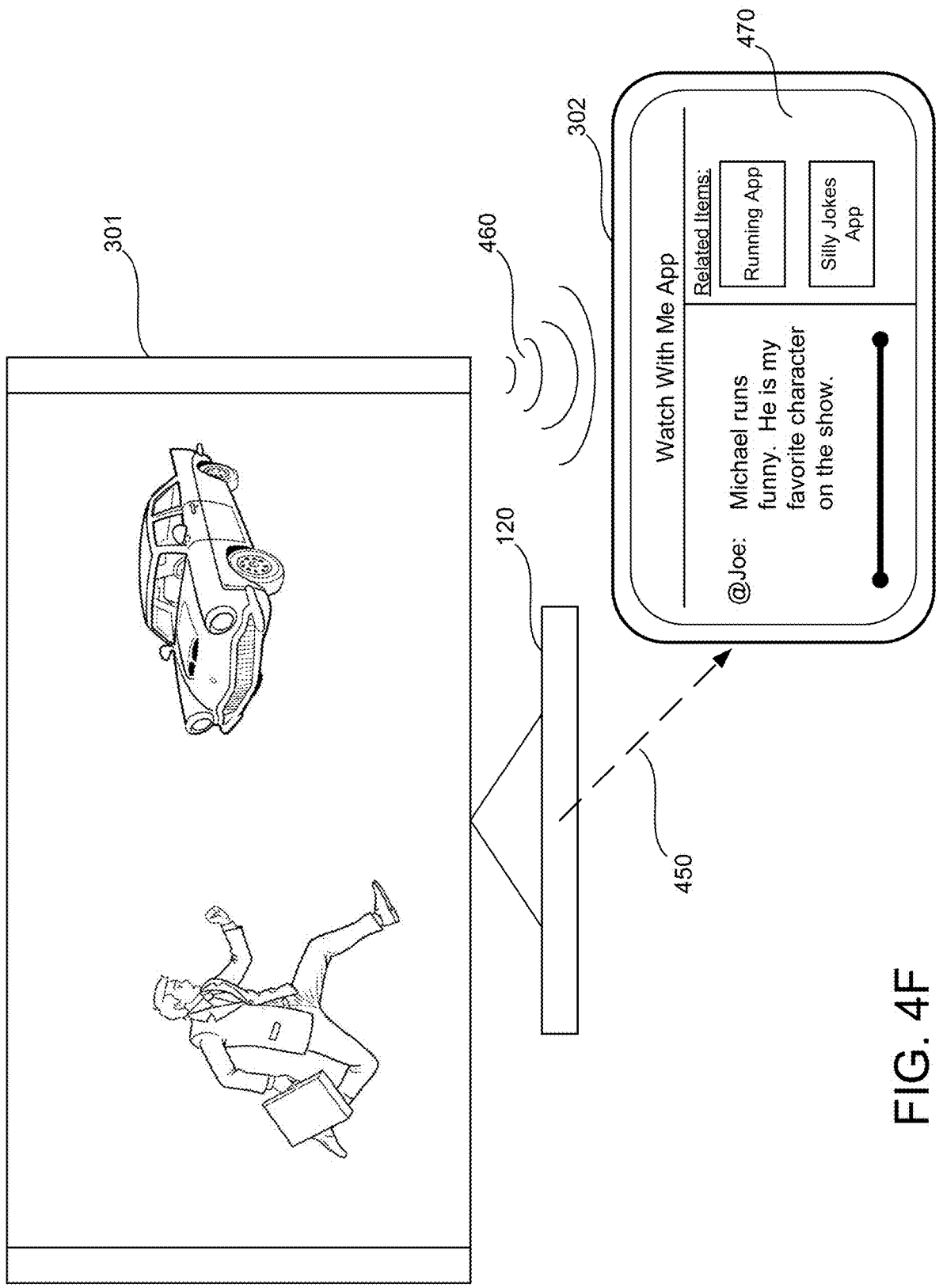

FIG. 4F is a diagram illustrating another aspect of the present disclosure. In FIG. 4F, a piece of primary content, such as an episode of "The Office," may be presented on a first screen device 301 (e.g., a television, computer, etc.). Meanwhile, a user may execute an application (or computer program) to consume, via a second screen device 302 (e.g., a tablet, smartphone, etc.), supplemental content related to the primary content presented on the first screen device 301. For example, the second screen device 302 in FIG. 4F may run an application, referred to as the "Watch With Me App," to view supplemental content for the episode of "The Office" presented on the first screen device 301. An interface 120 connected to the first screen device 301 or the first screen device 301 itself may send one or more triggers 450 to the second screen device 302 indicating what primary content is being presented on the first screen device 301. For example, the triggers 450 may indicate a name (e.g., "The Office") of the primary content, a particular episode of the particular content, and/or a particular segment or point in time of the primary content. The triggers 450 may be sent via a wired or wireless connection. Alternatively, or additionally, the second screen device 302 may determine what content the first screen device 301 is presenting by analyzing audio signals 460 received from the first screen device 301.

Using the triggers 450, audio signals 460, and/or an explicit time code, the second screen device 302 may determine which portion (or segment) of the content is being presented. Based on this information, the second screen device 302, and in particular, the "Watch With Me App" running on the second screen device 302, may display corresponding supplemental content. That is, the supplemental content presented on the second screen device 302 may be synchronized with the content presented on the first screen device 301. Furthermore, the second screen device 302 may present related items in a discovery frame 470 that are also synchronized with the supplemental content and/or primary content. For example, as shown in FIG. 4F, a person within the primary content may be running, and thus, the second screen device 302 may display an item related to running, such as the "Running App." While the second screen device 302 may present items related to specific events within the primary content, the second screen device 302 may also present items generally related to the primary content, such as the "Silly Jokes App." The order in which these items appear within the discovery frame 470 may vary, and may be determined based on ratings or a pay-for-placement scheme whereby creators/owners of items pay for inclusion and ranking within the item list as described in more detail below. Additionally, or alternatively, the order may be such that priority is given to items related to the events occurring in the primary content over more generally related items and vice versa. For example, in FIG. 4F, the event of a person running may cause the "Running App"

item to be presented above (or, when the discovery frame 470 is horizontally elongated, to the left of) the "Silly Jokes App," which is generally related to "The Office," but not particularly relevant to the portion of "The Office" currently presented on the first screen device 301.

Figure 4G:
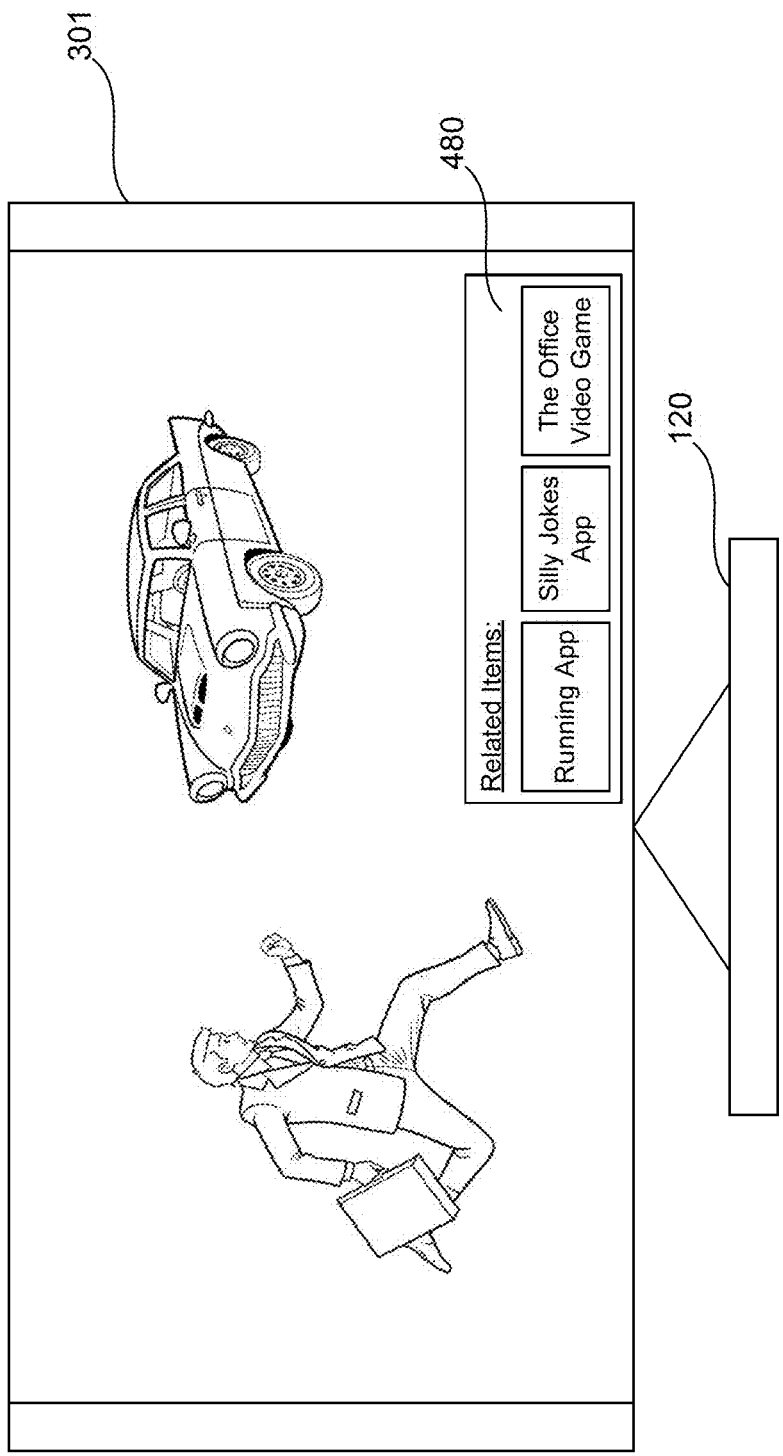

FIG. 4G is a diagram illustrating another aspect of the disclosure. In particular, FIG. 4G illustrates another manner in which to display a discovery frame 480 including items related to primary content presented on a first screen device 301. In FIG. 4G, the discovery frame 480 may appear as an overlay on the first screen device 301. In other words, the discovery frame 480 may cover a portion of the primary content presented on the first screen device 301. The discovery frame 480 may continuously appear on the first screen device 301 and the items in the discovery frame 480 may change according to changes in the primary content. Alternatively, the discovery frame 480 might only appear when related items are detected as corresponding to the particular piece of primary content. Therefore, the related items may pop-up onto the screen of the first screen device 301 as the primary content progresses and stay on the screen for some predetermined period of time. In other embodiments, the discovery frame 480 might only appear when a user chooses to see related items. For example, the discovery frame 480 might only be displayed when a user controls the first screen device 301 to show the discovery frame using a remote control. The specific items presented in the discovery frame 480 may be detected based on triggers (not shown) as described above with respect to FIG. 4F. Once discovered and presented in the discovery frame 480, items may be selected thereby causing the item to be launched directly on the first screen device 301 or on a second screen device 302 in proximity to the first screen device 301.

Figure 4H:
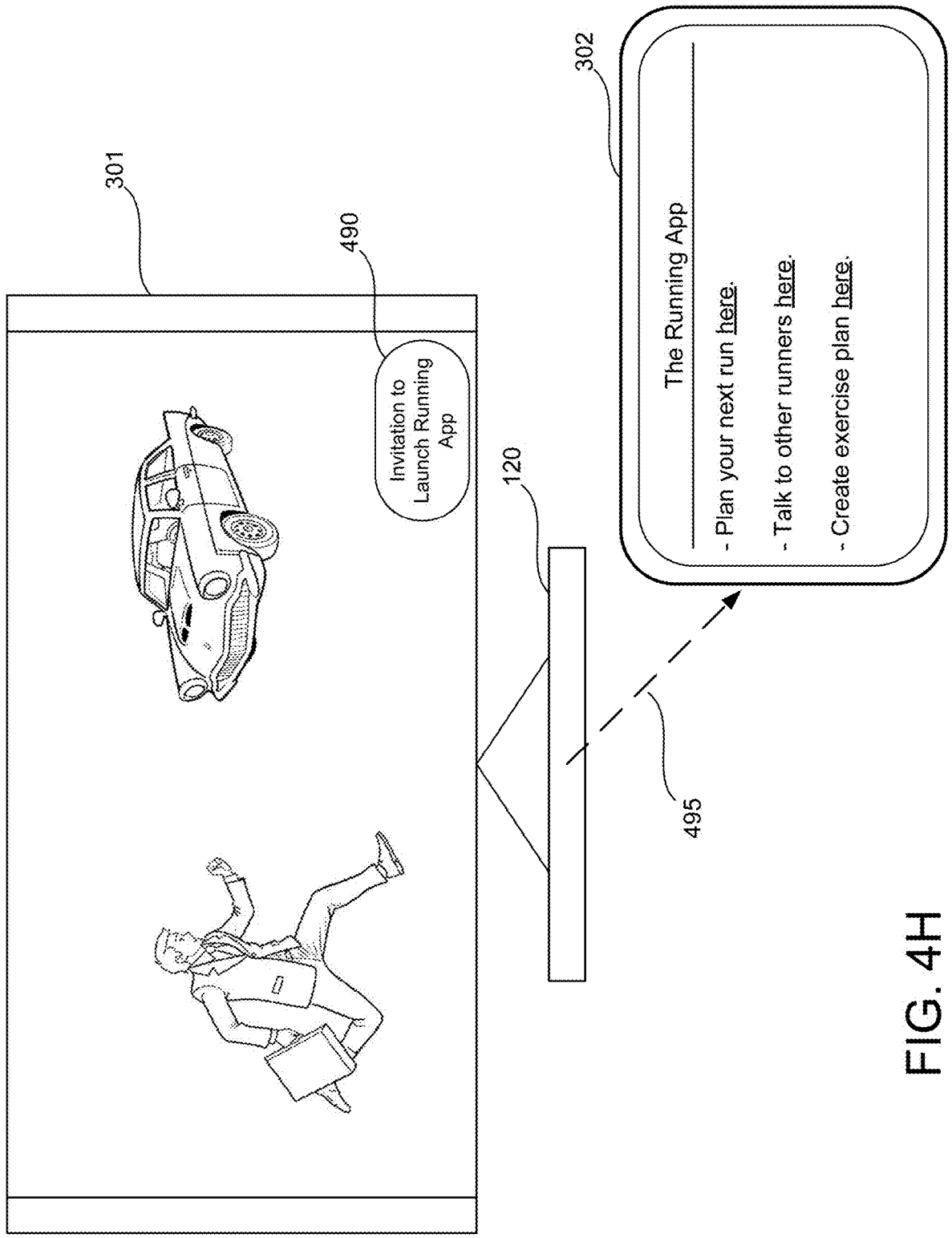

FIG. 4H illustrates an embodiment in which an invitation to launch an item may be presented as opposed to a discovery frame. As shown in FIG. 4H, an invitation 490 to launch an item (e.g., a "Running App") may be presented on a first screen device 301 in response to one or more triggers detected in the video and/or audio streams of the primary content being displayed on the first screen device 301. In addition, or alternatively, the invitation 490 may be presented on a second screen device 302 in proximity to or in communication with the first screen device 301. In any event, when the invitation is accepted (e.g., by pressing a button on a remote of the first screen device), the item may be launched on the first screen device 301 or second screen device 302. Referring to the example in FIG. 4H, when a trigger within the primary content, which indicates that a person is running, is detected, an invitation 490 to launch a related item may be displayed on the first screen device 301. Then, when a user selects the invitation 490, the interface 120 may transmit a signal 495 instructing the second screen device 302 to launch the related item. Additionally, if the second screen device 302 does not already have the executable file of the related item, the signal 495 may include the executable file, or may include information indicating where the second screen device 302 may access the executable file.

Also, although the invitation 490 is shown in FIG. 4H, it might not be included within some embodiments, and instead, the item may be automatically launched upon detection of a trigger. For example, a user may set a user preference to automatically launch items on a particular second screen device 302 that are related to certain triggers when such triggers are detected.

Figure 5A:
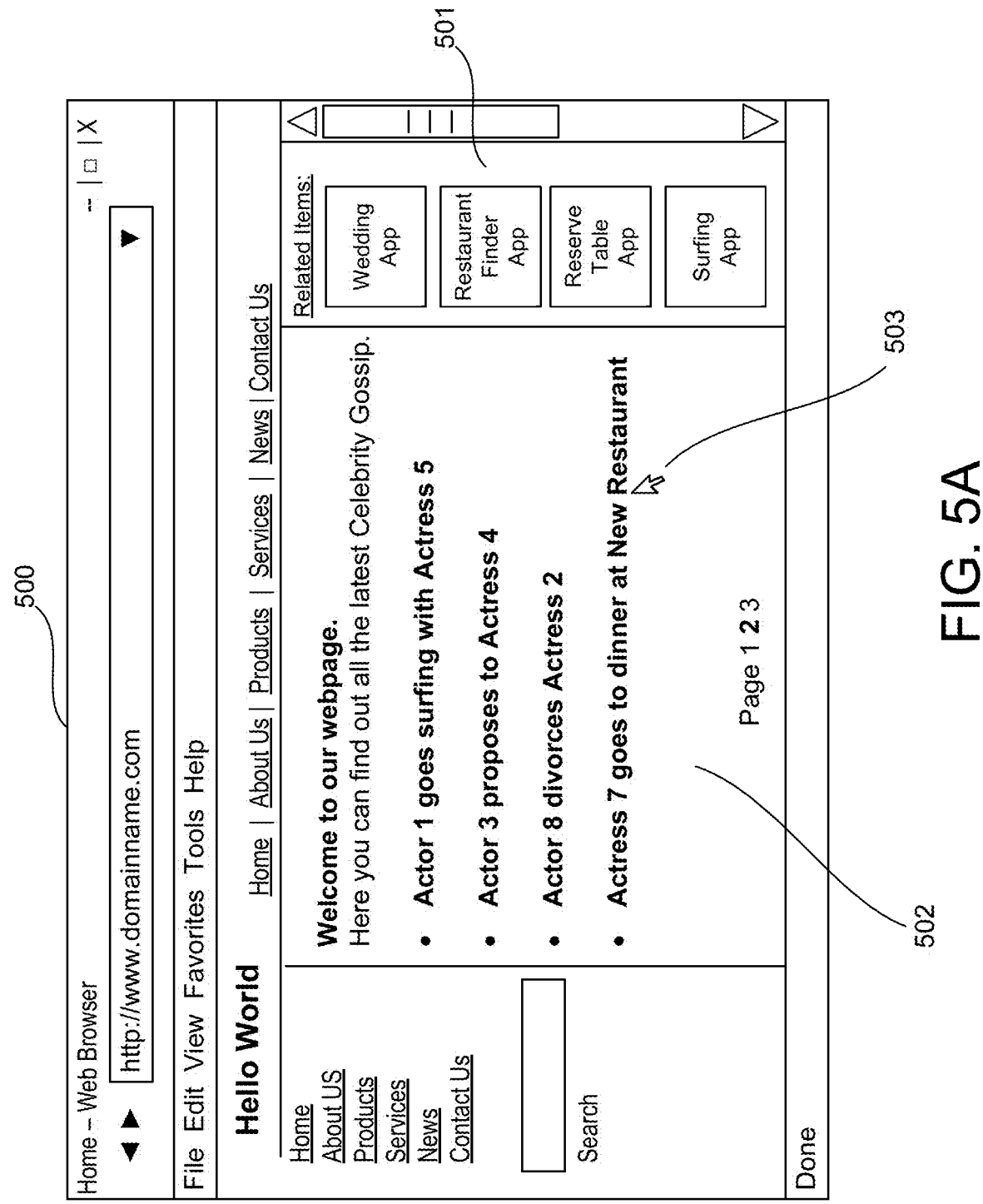
FIGS. 5A-5C are diagrams illustrating example embodiments of various user interfaces.

FIG. 5A illustrates a webpage 500 that may be displayed on a first screen device 301, a second screen device 302, or other computing device 200 using a web browser. In some examples, the webpage 500 may belong to a website hosted by the second screen experience manager 340. Alternatively, the host of the webpage 500 may be another computing device in communication with the second screen experience manager 340, or the webpage 500 may include scripting code for accessing the second screen experience manager 340, so that the webpage 500 may be populated with related items.

Notably, the webpage 500 may include a discovery frame 501. The discovery frame 501 may be generated by the web browser to display items that are related to the webpage 500. If it is determined that there are such related items, then the related items may be presented in the discovery frame 501. One manner for determining which items, if any, are related to the webpage 500 may be to analyze the URL of the webpage, and compare it to a list of available items. Specifically, an item detection system (discussed in further detail below) may detect items that are related to the webpage 500 based on the URL of the webpage 500 and its contents, and the detected items may be presented in the discovery frame 501 on the webpage 500. For example, if the webpage 500 is a webpage for a television program, such as "The Office," then an item detection system may detect items related to "The Office," such as the "Silly Jokes App" (mentioned above with respect to FIG. 4A), based on knowledge that the URL of the webpage 500 corresponds to "The Office" television program.

Additionally, or alternatively, items may be related to the webpage 500 if they are associated with the owner or host of the webpage 500. Therefore, the item detection system may also analyze information on the owner or host of a webpage 500 to determine which items to present in the discovery frame 501. Yet another manner to detect related items of the webpage 500 may include analyzing the primary content presented in the main portion 502 of the webpage 500 or in another webpage from the same website as the webpage 500. For example, referring to FIG. 5A, the main portion 502 of the webpage may include celebrity gossip, and in particular may include a story involving an actor going surfing with an actress. Accordingly, an item in the discovery frame 501 of the same webpage 500 may be related to surfing, such as the "Surfing App." Still referring to FIG. 5A, the main portion 502 may include another story about an actress going to dinner at a new restaurant. As a result, the discovery frame 501 may also present an item related to finding restaurants, such as the "Restaurant Finder App."

In some examples, the selection and sequencing of items presented in the discovery frame 501 may be dynamically modified as the user moves a cursor 503 on the webpage. For example, if the cursor 503 is over or near the story about the actress going to dinner at the new restaurant, then the discovery frame 501 might only present items related to the new restaurant or restaurants in general. Alternatively, the location of the cursor 503 may influence the order in which items appear in the discovery frame 501. For example, referring to FIG. 5A, because the cursor 503 is located closer to the story about the actress going to the new restaurant than to the surfing story, the "Restaurant Finder App" may be positioned above the "Surfing App." To avoid excessive reordering of the items within the discovery frame 501, the cursor 503 may have to be within a certain proximity to a particular part of the primary content (e.g., the surfing story) for a certain period of time before the items are reordered. Further, in some cases, certain items may be locked into their position (e.g., a specific item may be guaranteed a top position).

In order to associate a portion of a webpage 500 with related items, the webpage 500 may contain elements (e.g., HTML elements) that have specific context information or explicit item associations. As a result, when a cursor is moved within some proximity to the element or the element is clicked, the element may invoke processing to determine related items for the discovery frame 501. In some embodiments, the webpage 500 itself (without additional elements for context information or explicit item associations) can determine changes in context based on cursor location (e.g., mouseover events) or click events, and then call the second screen experience manager 340 to determine the appropriate list of items for the discovery frame 501. Also, the webpage 500 may collect (e.g., at load time or prior thereto) all items based on the context information of the webpage 500 so that relatively rapid adjustment of the order of the items in the discovery frame 501 may be achieved.

Figure 5B:
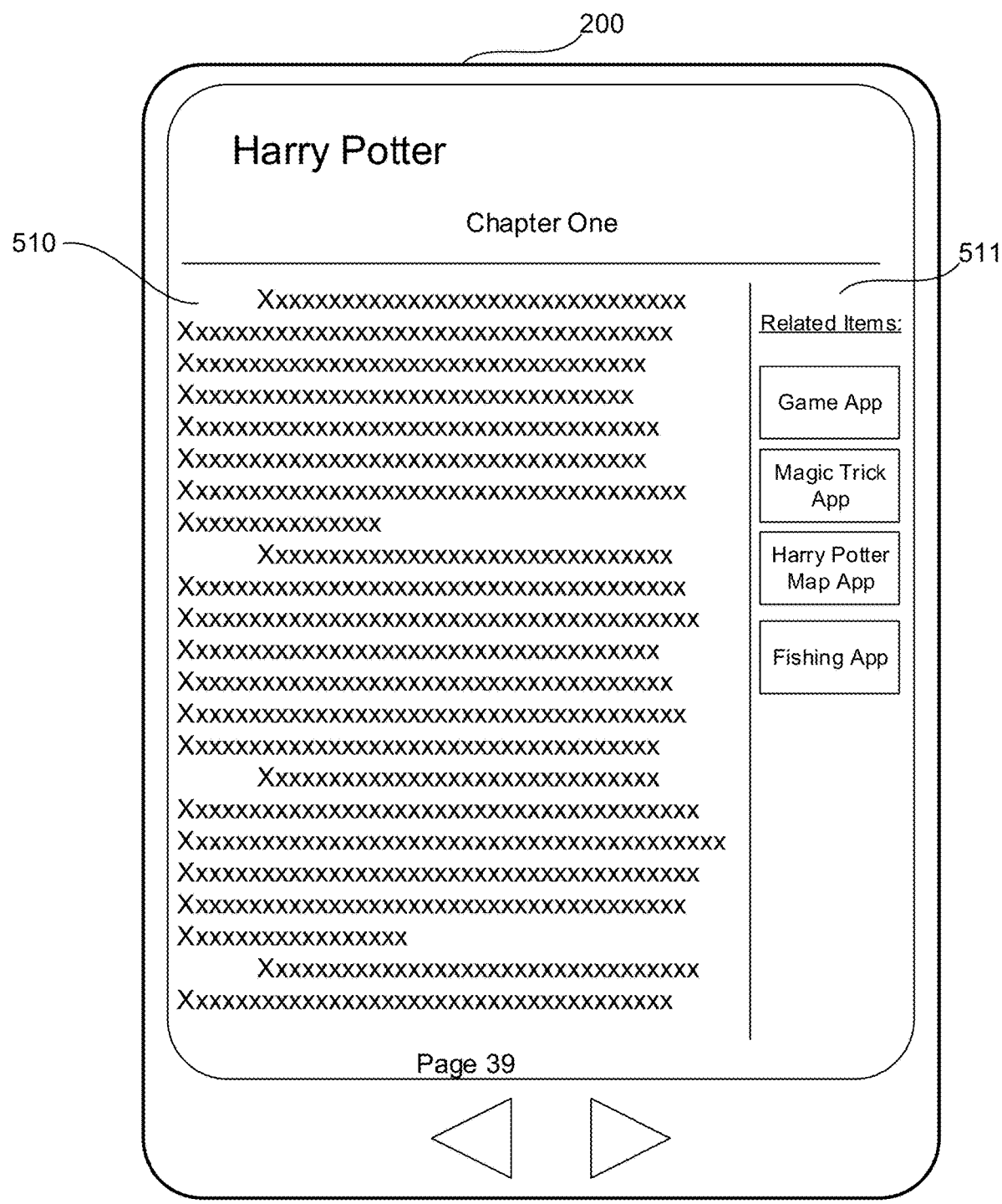

FIG. 5B shows a computing device 200 (e.g., a tablet) configured to present an electronic publication 510, such as an electronic book, electronic newspaper, electronic magazine, etc. Alongside of, or over the top of, the electronic publication 510, the computing device 200 may display a discovery frame 511. The discovery frame 511 may include items related to the content of the electronic publication 510. For example, in FIG. 5B, the electronic publication 510 may include a "Harry Potter" book in digital form, and therefore, items associated with the "Harry Potter" book may be presented in the discovery frame 511. The "Harry Potter" book may be associated with an application for teaching magic tricks called a "Magic Trick App," in a case where the book is about children who have special powers. That is, the items in the discovery frame 511 may be generally related to the electronic publication 510. However, more specific relationships between the content of the electronic publication 510 and the items of the discovery frame 511 may exist. For example, the related items may include a "Fishing App" item, if the content on the page being shown (e.g., page 39) describes a character going fishing. Context information may be embedded in various parts of the page so that the related items for that page may be detected. In such embodiments, where the content of the page (or portion being displayed) impacts which items are presented, it should be realized that as a user navigates from one page to another (or scrolls from one portion of a page to another portion), the items presented in the discovery frame 511 may change since the context information of the content being consumed may change. Also, context information may be extracted and used to determine related items when a user highlights a word or phrase. In other words, highlighting, or otherwise selecting, a word or phrase in the electronic publication 510 may trigger the computing device 200 to use the highlighted text as context information to retrieve a list of items explicitly or implicitly associated with the highlighted text.

Figure 5C:
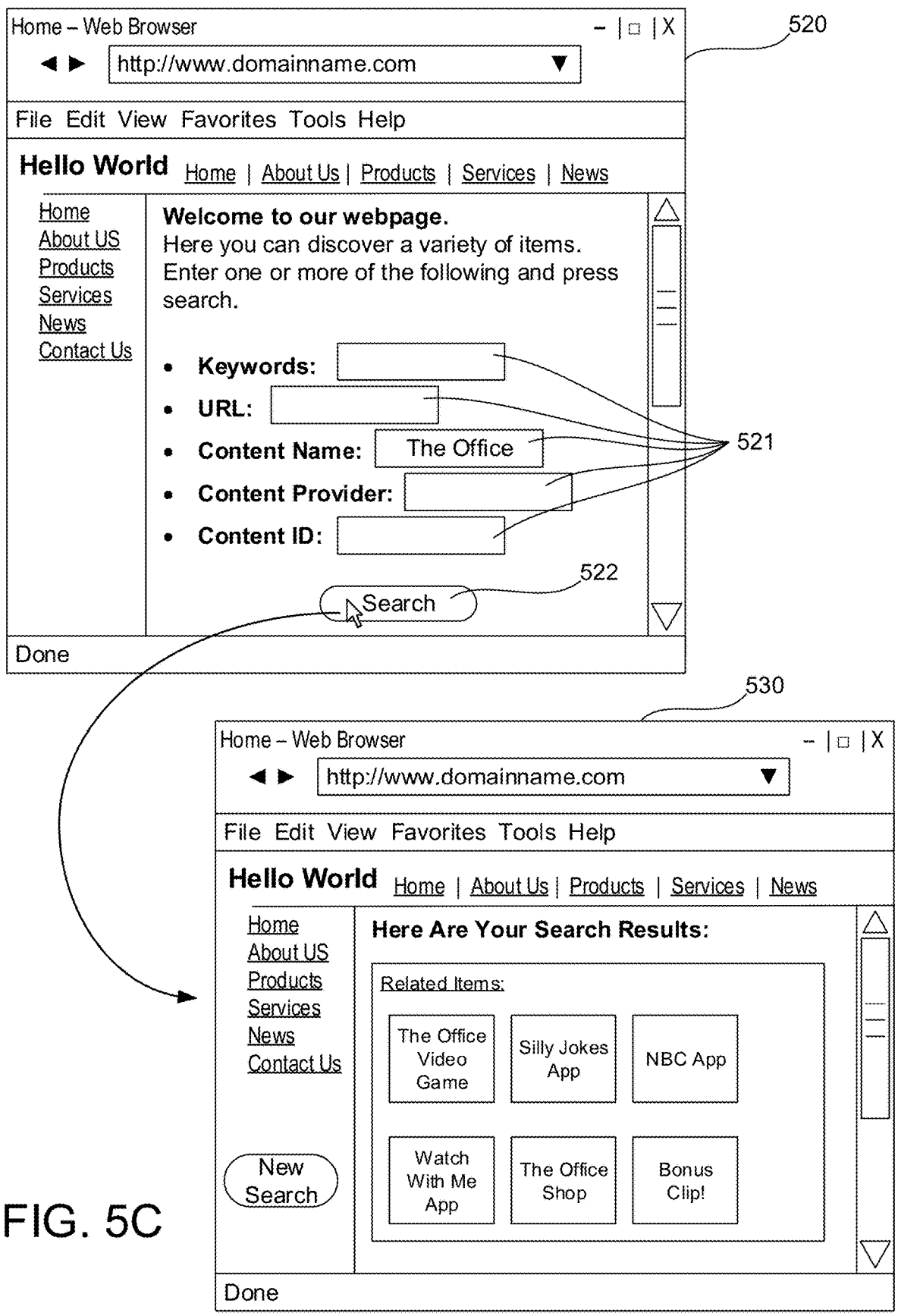

FIG. 5C illustrates a webpage 520 that may be displayed on a first screen device 301, a second screen device 302, or other computing device 200 using a web browser. In some examples, the webpage 520 may belong to a website hosted by the second screen experience manager 340.

Referring to FIG. 5C, the webpage 520 may include one or more user input fields 521 configured to receive user input (e.g., keywords) entered by a user through, for example, a keyboard, microphone, etc. The webpage 520 may also include a search button 522 configured to, when selected, cause an item detection system (described in more detail below) to search for related items (e.g., applications/computer programs) based on the user input in the user input field(s) 501.

After the search button 502 is selected, a new webpage 530 may be displayed. The new webpage 530 may display detected items based on the search results. For example, referring to FIG. 5C, if a user enters "The Office" into a field 521 for capturing a content name (e.g., television program name) and selects the search button 502, then the webpage 530 may present one or more items related to "The Office," which is a television program provided by NBC. In some examples, the displayed items may be displayed in an order based on a rating or degree of relevance. The rating or degree of relevance may take into consideration user preferences of the user operating the web browser that renders the webpage 530.

Figure 6:
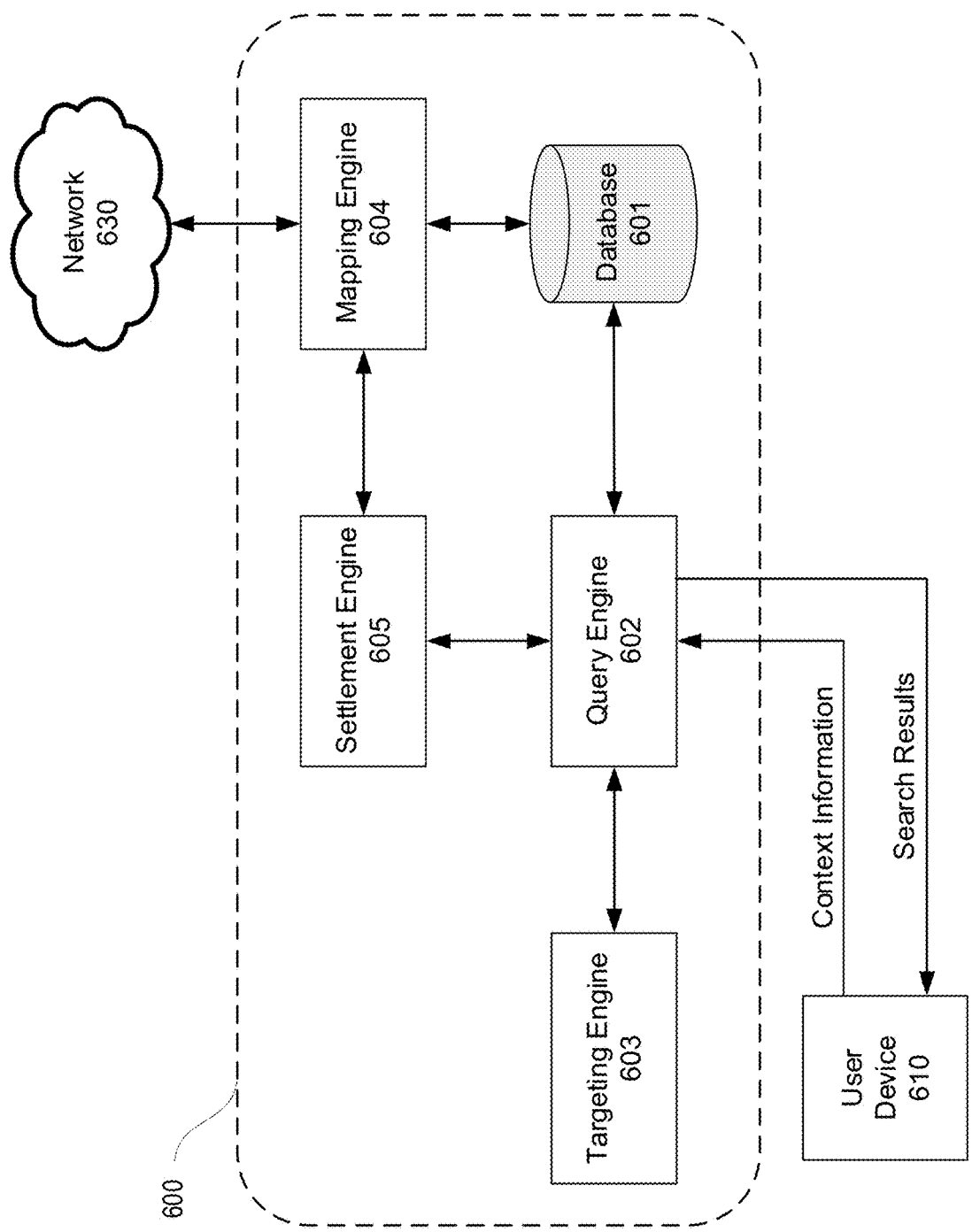
FIG. 6 illustrates a system architecture according to one or more aspects described herein.

FIG. 6 is a diagram illustrating an example configuration of an item detection system 600 that may detect relevant items based on context information of primary content, such as, for example, a title of a selected piece of content in a program guide 400 as described with respect to FIG. 4A or the user input entered in a webpage 500 as described with respect to FIG. 5C. The item detection system 600 may be embodied within the local office 103 of FIG. 3, the second screen experience manager 340 of FIG. 3, or one or more other computing devices 200 connected elsewhere on the network 330 of FIG. 3. As shown in FIG. 6, the item detection system 600 may include an item database 601, a query engine 602, a targeting engine 603, a mapping engine 604, and a settlement engine 605.

The item database 601 may store item data, including one or more items (e.g., applications, audio/video content, links, etc.) and item information (e.g., context information, an item ID, author information, platform information, rating information, etc.) in association with each item. Item information may be used to determine which items are of interest. For example, item information may be searched to identify one or more items, and those items may be displayed in a discovery frame 405 of the program guide 400. Table 1 below shows a graphical representation of example item data stored in the item database 601.

TABLE 1

| Item Data | Item Information | | | | | |
|---|---|---|---|---|---|---|
| Item/Item Name | ID | Content | Channel | Keywords | Platform | Rating |
| The Office Video Game | 1 | The Office | NBC TBS | Comedy Steve Carell Video game Trivia | Xbox | 2.5 |
| NBC App | 2 | 30 Rock Apprentice Community The Office ... | NBC | NBC | iOS | 4.5 |

TABLE 1-continued

| Item Data | Item Information | | | | | |
|---|---|---|---|---|---|---|
| Item/Item Name | ID | Content | Channel | Keywords | Platform | Rating |
| NBC App | 3 | 30 Rock Apprentice Community The Office ... | NBC | NBC | Android | 4.3 |
| NBC App | 4 | 30 Rock Apprentice Community The Office ... | NBC | NBC | Windows Phone | 4.5 |
| The Office Shop | 5 | The Office | NBC TBS | Comedy Steve Carell | Any web browser | 3 |
| Watch With Me | 6 | 30 Rock Apprentice Community The Office Local Prog. Conan Baseball ... | NBC Local TBS CBS FOX TNT USA ... | Tablet iPAD Extra Twitter Facebook Comments | iOS | 5 |
| Silly Jokes App | 7 | 30 Rock Community The Office | NBC TBS Spike | Comedy | iOS | 3.5 |
| Bonus Clip! | 8 | The Office | NBC | | MPEG2 | 3.7 |

Table 1 includes items corresponding to the items shown in FIG. 4A. As shown in Table 1, each item may be associated with item information. Table 1 illustrates a number of columns for various types of item information. In the "ID" column, item information may include an item identification number that may be unique to each item. This number may be generated according to an algorithm so that identification numbers are sequentially assigned or may be generated randomly. The item identification number may be used to reference items so that items can be transferred between devices and/or modules. In the "Content" column, item information may include a name of primary content (e.g., a television show/program, movie, etc.) associated with the item. For example, the "Watch With Me" item may be associated with one or more shows that supplemental content is available for. In other words, if the "Watch With Me" item includes supplemental content for the television show "30 Rock," then the item information may include "30 Rock" (or some other type of data identifying the "30 Rock" program) in the "Content" column associated with the "Watch With Me" item. However, if the "Watch With Me" item does not include supplemental content for the television show "30" Rock," the "Content" column associated with the "Watch With Me" item might not identify "30 Rock." In the "Channel" column, item information may identify a logical channel (e.g., NBC, channel 4, etc.) associated with a particular item. For example, the "NBC App" item may be associated with a logical channel carrying content provided by the National Broadcasting Company (NBC). As a result, whenever a user scrolls over a program shown on a logical channel carrying content provided by NBC, the "NBC App" may appear in the discovery frame 405 of the program guide 400. In the "Keywords" column, item information may include a plurality of words, terms, phrases, etc. that may be used to describe or otherwise identify an item. Users may set preferences that may be compared to item information in the "Keywords" column to help users identify items that are related to their preferences. The item information included in the "Keywords" column may be set by a provider of the item or another administrator, or administrative organization, so that the associated item is more likely to be discovered by a targeted group of consumers. For example, the creator of an application for searching for travel deals may include the word "travel" as item information in the "Keyword" column for that application, so that users who specify that they enjoy traveling are more likely to discover the application than users who do not specify that they enjoy traveling (or specify that they do not enjoy traveling). In the "Platform" column, item information may indicate which platforms the item is compatible with. As shown in Table 1, three different versions of the "NBC App" may exist for three different platforms: Apple's iOS™, Google's ANDROID™, and Microsoft's WINDOWS PHONE™. In some cases, a single item may be compatible with a plurality of platforms. Here, the term "platform" is not limited to operating systems, but may also specify file extensions or standards. Further, it is contemplated that various devices may be suited for various platforms, so the item information in the "Platform" column, or another column, may indicate which devices are compatible or suited for the associated item. In the "Rating" column, item information may include a rating associated with the item. This rating may be based on consumer feedback. In some cases, a single item may be rated for a variety of characteristics. For example, an application may have a sports rating and a separate music rating. Therefore, the item information may be used to detect items for users who like sports and users who like music. As a result, a user who identifies himself as more of a sports person than a music person may be exposed to an item having a relatively high sports rating although its music rating is relatively low.

It should be understood that Table 1 illustrates example relationships of various information stored in memory, and that these relationships could also be illustrated with more than one table. For example, there could be three tables where a first table includes metadata in association with items, a second table includes identifiers in association with content, and a third table includes links between the first table and second table. In some examples, storage capacity may be conserved with a three table arrangement as one entry in the first table can link to multiple entries in the second table and one entry in the second table can link to multiple entries in the first table. This arrangement may be particularly desirable where there are similar items for multiple platforms. It should also be understood that Table 1 above illustrates only some of the types of item information that may be stored in the database 601. In other embodiments, more or less item information may be stored. For example, an additional column may include an Entertainment Identifier Registry (EIDR) identifier associated with each piece of content. Also, each item does not have to include each type of item information. Some items may have data for each type of item information while some items may have data for just some of the types of item information. This is illustrated in Table 1 by the empty cell in the "Keywords" column for the "Bonus Clip!" item.

The database 601, regardless of its contents, may be configured to connect to the query engine 602 of the item detection system 600. The query engine 602 may be a module of code, including computer-executable instructions, executed by a processor of a computing device 200. The query engine 602 may be configured to receive context information from a user device 610, which may be a first screen device 301, second screen device 302, interface 120, or any other computing device 200. The context information may include any type of data that can be used to search the database 101. In other words, context information may include any type of data that associates an item to content. For example, the context information may be an identifier that identifies a selected content or portion thereof. Specifically, the context information may include the name of a television program selected using a program guide 400. Another example of context information may be the name (e.g., NBC) or number (e.g., channel 4) associated with a logical channel number or service identifier that a user is scrolling over within the program guide 400. Still another example of context information may include keywords (e.g., "video games," "football," "trivia," etc.), a URL (e.g., "http://www.youtube.com"), or the name of a book or other publication (including those available in digital form) entered into user input fields 501 of a webpage 500. In some examples, context information may also include user preferences associated with a user of the user device 610 or the user device 610 itself. Additionally, or alternatively, in some cases, the context information may include information about the user device 610, such as what operating system the user device 610 is running, what type of display the user device 610 is coupled to, what type of video card the user device 610 includes, or any other information pertaining to the software and/or hardware of the user device 610. The following provides a non-exhaustive list of examples of context information: a content title (e.g., television program title, electronic book title, etc.); content description; content format (e.g., image, video, etc.); content file-type (e.g., .avi, .divx, .mov, etc.); genre (sports, comedy, romance, reality television, etc.); content provider; keywords or search string; location in program guide 400 or other screens; location in webpage 500; information regarding other items; program ID; episode ID; series ID; actor/actress names; producer/director names; paid associations (sponsorships); item ID (where item owner/creator explicitly designates an item as corresponding to content); program closed captioning feed; video data of content; audio data of content; similar asset consumption data (those who liked this content consumed this application); time of day; demographics of user; etc.

Using the context information, the query engine 602 may search the database 601. The query engine 602 may prompt a user for additional information if no search results are found. If search results are found, the query engine 602 may return the results to the user device 610. Also, if there are search results, the search results may include one or more items that were identified as matching the context information. For example, a plurality of items may be returned in response to a search using the contextual information even where the contextual information only includes a single piece of information, such as a television program name In some embodiments, the number of items of the search results may vary depending on the user device 610 to which the search results are transmitted. For example, referring to FIG. 4A, if the program guide 400 is configured to display only four items, then the query engine 602 may only send four items (which may be selected based on a rating). To accomplish this, the initial request for related items (e.g., the request including the context information) may also indicate how many results are desired (e.g., how many slots are available for displaying related items). Alternatively, the query engine 602 may identify the requesting device, type of requesting device (e.g., whether it is a smartphone, tablet computer, personal computer, etc.), or the type of frame for presenting the items (e.g., whether it is discovery frame 405 of FIG. 4A, detailed information frame 412 of FIG. 4B, discovery frame 422 of FIG. 4C, etc.), and may consult a database to determine how many items can be displayed for that requesting device, type of requesting device, or type of frame. In other embodiments, the query engine 602 may be configured to transmit up to a certain number of items (which may vary based upon heuristics), and the user device 610 may be configured to select which items to present. Further, the query engine 602 may perform more than one search at the same time. Moreover, the query engine 602 may be configured to perform one or more of a variety of search algorithms.

As shown in FIG. 6, the item detection system 600 may include a targeting engine 603 as well. The targeting engine 603 may be a module of code, including computer-executable instructions, executed by a processor of a computing device 200. The targeting engine 603 may be configured to assist the query engine in performing the search so that the search results are targeted to the user submitting the context information via the user device 610. Specifically, the targeting engine 603 may filter search results or modify search parameters so that, search results based on context information may vary according to demographics, geographic location, time of day, and other such information. In other words, the targeting engine 603 may leverage demographic information, which may be generated based on survey information, to filter search results to remove items that are not commonly desired by a certain population, when a member of that population is to receive the items. For example, if context information includes information indicating that a user is a child, the targeting engine 603 may filter the results of the query engine 602, so that the results returned to the user may include items targeted for children.

Further, the mapping engine 604 may be configured to provide an interface for entities that wish to register items with the database 601. The mapping engine 604 may be a module of code, including computer-executable instructions, executed by a processor of a computing device 200. As shown in FIG. 6, the mapping engine 604 may be configured to communicate with a network 630. The mapping engine 604 may provide a web portal which entities may access using their own devices via the network 630. Once at the web portal, an entity may submit an item (e.g., an application) to be uploaded to the database 101. At that time, the entity may also submit other item information to be associated with the item. For example, the entity may submit a program ID of a program that the entity wishes its item to be associated with. As a result, an entity providing an item may control which pieces of content their items are associated with. In other cases, an entity may select a genre (e.g., science fiction, sports, reality television, etc.) that it wishes to associate its item with.

The mapping engine 604 may determine whether an item is accepted for registration with the database 601. In some examples, an item may be accepted if it meets certain criteria, such as it is an acceptable type of file, does not exceed a certain file size, and/or terms and conditions have been agreed to by the creator of the item. When the mapping engine 604 determines that an item is accepted, the mapping engine 604 may cause the item and its associated item information to be stored in the database 601. The mapping engine 604 may also allow the item and associated item information to be subsequently edited. Additionally, the mapping engine 604 may assign priorities and/or ratings to the items entered into the database 601. The priorities and ratings of the items may be based on a subscription tier of the entity providing the item. For example, if the provider of an item is a premium-level customer, the item may be given a higher priority and/or rating so that the item is more likely to be included in search results obtained by the query engine 602. The level/tier of an entity may be based on popularity, trustworthiness, etc. of the entity and/or fees collected from the entity or from end users of the items. Therefore, the mapping engine 604 may be configured to determine the level/tier of various entities based on these characteristics.

To obtain information for making determinations based on such characteristics, the mapping engine 604 may use a settlement engine 605. The settlement engine 605 may be a module of code, including computer-executable instructions, executed by a processor of a computing device 200. The settlement engine 605 may track which items are showing up in search results of the query engine 602 and/or which items are being transferred from the query engine 602 to end users. The settlement engine 605 may also be configured to track placement of items and fees collected from the entity and/or end users of the items. For example, the settlement engine 605 may determine that an entity, which created/supplied a particular item, owes a certain amount of money based on placement of the particular item in a program guide 400. The settlement engine 605 may determine the identity of the entity with the assistance of the mapping engine 604, which may determine which entities are associated with which items.

Figure 7:
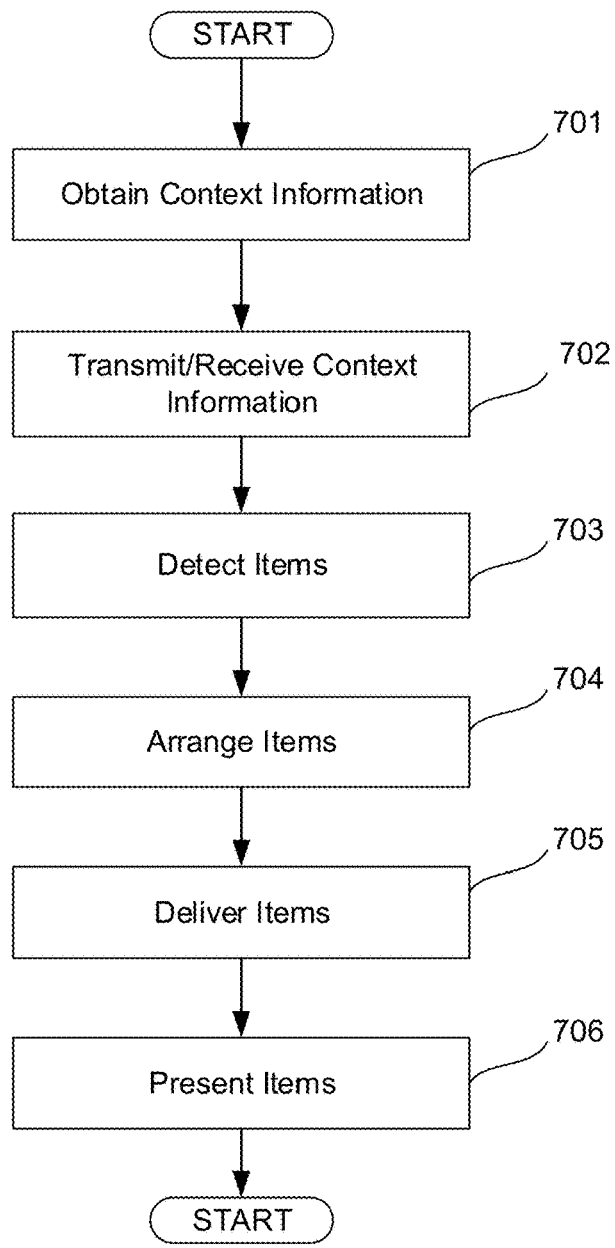
FIG. 7 is a flow diagram illustrating an example method according to one or more aspects of the disclosure.

FIG. 7 is a flow diagram illustrating an example method of the present disclosure. The flow diagram illustrates steps that may be performed, for example, by the item detection system 600 and/or computing devices 200 which may be in communication with the item detection system, such as first screen devices 301 and second screen devices 302.

In step 701, context information may be obtained to determine or describe criteria that will be used in a search to find related items that may be of interest to the user. The manner in which the context information is obtained may vary according to the particular embodiment. For example, referring to FIG. 4A, context information may be obtained by extracting context information (not shown) embedded within the content options 401. Specifically, when a user navigates to a content option 401, a script (e.g., computer code, such as a JavaScript) within the program guide 400 or another application interface, or a computing device 200, such as an interface 120 or the first screen device 301, may identify the selected content option 401 and extract the context information for that content option 401. Also, referring to FIGS. 5A and 5B, various context information may be embedded throughout other sources such as the webpage 500 and electronic publication 510, respectively. Context information may be extracted in some examples of step 701 as well, so that items related to particular portions of the webpage 500 and electronic publication 510 being consumed may be detected. As described above, the context information may include any type of data, such as a content name (e.g., television program name), content identifier, genre, event identifier (e.g., fishing), etc. that can be used to detect items. Accordingly, in the example of FIG. 4A, step 701 may be performed to obtain a content title—"The Office"—by extracting such title from the selected content option 401.

Once context information is obtained, it may be transmitted to and received by the item detection system 600 at step 702. For example, the context information may be received by the query engine 602 of the item detection system. The item detection system 600 may receive the context information via various connections, including the links 101 and network 330. For example, where the item detection system 600 is located at the local office 103, the context information may be transmitted in the upstream bandwidth of the links 101 from the interface 120 through the TS 104 to the item detection system 600. In another example, where the item detection system 600 is located within or associated with the second screen experience manager 340, the context information may be transmitted wirelessly from a second screen device 302 to the second screen experience manager 340, for example, through the network 330.

In step 703, the received context information is used to detect items related to the content from which the context information is obtained. This detection may comprise searching a database 601 using the context information. When detecting related items, the item detection system 600 may be configured to search the database 601 until a certain number of related items are detected or to search the entire database 601 and choose a certain number of items from among all the items identified as having some relevance, e.g., a predetermined level of relevance. In some examples, an item might only be detected as a related item if it meets two or more criteria. For example, an item might only be detected or identified if it is operable on a particular platform and has a keyword matching one of the corresponding criteria in the context information. Various embodiments may use different algorithms for performing the search and detecting items at step 703.

In step 704, the item detection system 600 may rank or arrange items in order based on various factors. One such factor may be a rating, which may be determined based on user feedback. For example, users may rate a particular item as deserving 4 out of 5 stars, and thus, the particular item may have a 4.0 rating. Another factor may be a priority associated with the item, which may be determined based on a status (e.g., premium status) of an entity that created or provided the item. For example, some entities may subscribe for premium status so that the items they submit have a higher priority, and therefore, may have a higher likelihood of being distributed. Yet another factor may be a degree of relevance, which may be a score representing how similar an item is to the received context information. Demographic and geographical information associated with the context information as well as time of day information of when the context information is provided to the item detection system 600 may also be factored into the arrangement. The item detection system 600 may determine the demographic and geographical information based on the user device 610 providing the context information and/or based on consumption data of a user using the user device 610. Still another factor may be user preferences, which may be provided by a user. Weights may be assigned to one or more of the factors so that a final order may be determined.

In step 705, the detected items, which may be arranged in step 704, may be delivered to the user device 610 that supplied the context information used to detect the items. For example, the detected items may be returned to an interface 120 that supplied the context information. Alternatively, the detected items may be delivered to another computing device 200 associated with the user device 610 that supplied the context information. For example, a second screen device 302 may extract context information from an interface such as a program guide 400 and send the context information to the item detection system 600, which may deliver detected items to a first screen device 301 associated with the second screen device 302.

The user device 610 that receives the detected items may then present the items at step 706. The items may be presented within a designated portion of a screen of the user device 610. For example, referring to FIG. 4A, a first screen device 301 or second screen device 302 may receive the items 406 and present them in the discovery frame 405. Similarly, in the example embodiment of FIG. 4B, a first screen device 301 or second screen device 302 may receive items and present them in the detailed information frame 412. In the example embodiment of FIG. 4G, the interface 120 or first screen device 301 may receive the detected items and present them in the discovery frame 480 overlaying the primary content playing on the first screen device 301. Also, in the example embodiment of FIG. 5A, a web browser of a computing device 200 may receive the detected items and present them in the discovery frame 501 of the webpage 500. Or, in the example embodiment of FIG. 5B, the computing device 200 (e.g., an electronic book reader) may receive the detected items and present them in the discovery frame 511.

The item detection system 600 discussed above may assist users in discovering a number of applications, such as a supplemental content presentation application (also referred to herein as the "Watch With Me" application), that are related to a primary piece of content that the user is consuming. Below, further details describing the "Watch With Me" application are disclosed. The "Watch With Me" application may include computer-executable instructions that, when executed by at least one processor 201 of a computing device 200 (e.g., a second screen device 302), may cause the computing device 200 to render a second screen for presenting supplemental content related to primary content that is shown on a first screen device 301. The "Watch With Me" application may be launched/downloaded by any of the methods disclosed herein, such as by selecting the application from a program guide 400. The "Watch With Me" application may also be launched from within another application, and thus, the "Watch With Me" application could refer to one or more modules of code or scripts (e.g., JavaScripts) within a larger application. For example, the "Watch With Me" application could be launched when a user uses another application on the second screen device 302 to tune the first screen device 301 to a channel. At that time, the other application may determine whether supplemental content for the primary content on the tuned to channel is available through the "Watch With Me" application. If so, the other application may launch the "Watch With Me" application so that the supplemental content for the tuned to channel is presented on the second screen device 302.

Figure 8:
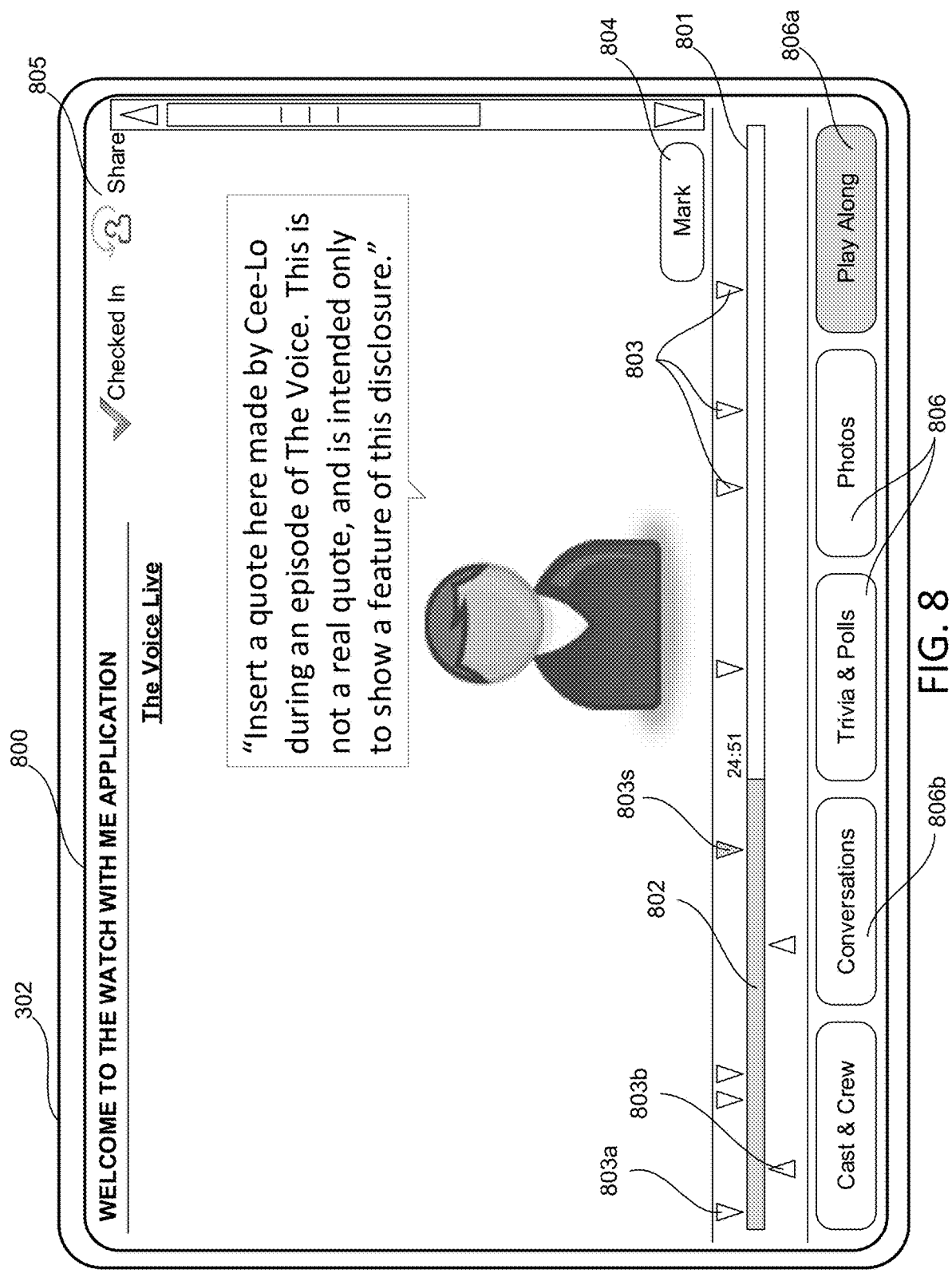
FIG. 8 is a diagram illustrating an example user interface with a timeline.

FIG. 8 is a diagram illustrating another aspect of the disclosure. Specifically, FIG. 8 illustrates an example second screen 800 presented on a second screen device 302. In the example embodiment of FIG. 8, the second screen 800 presents supplemental content related to primary content, such as a live television program called "The Voice," that is being consumed on a first screen device 301, such as a television. As shown, the supplemental content presented on the second screen 800 may include a quote from an individual on the show (e.g., Cee-Lo) along with an image of the individual. Example forms of supplemental content that may be presented include images (e.g., images from the show, pictures taken by people at the show, etc.), audio (e.g., a recording of a song sung by the original singer), video, and/or text.

The second screen 800 may also include a timeline 801. The timeline 801 shown on the second screen 800 may correspond to the piece of primary content (e.g., a television show, sporting event, etc.) being consumed on the first screen device 301. In the example of FIG. 8, the timeline 801 corresponds to an episode of "The Voice." If the second screen device 302 were controlled to display another second screen for another piece of primary content (e.g., a different television show or a different episode of "The Voice"), the timeline displayed on the other second screen might include different data.

The timeline 801 may provide a graphical, linear representation of events and the chronological order in which they occur within the corresponding piece of content. Herein, the timeline 801 may refer to the graphical representation and/or the data (or computer-executable instructions) used to render the timeline 801. Further, the timeline 801 may demonstrate the relationship between a point in time of the primary content and the supplemental content presented on the second screen 800. Referring to FIG. 8, a left end of the timeline 801 may represent a beginning of the primary content (e.g., a time point of zero minutes) while a right end of the timeline 801 may represent an end (or estimated end) of the primary content (e.g., a time point of 60 minutes). The timeline 801 may include a shaded portion 802 that changes in length along the timeline 801, and the rightmost edge of the shaded portion 802 demonstrates a point in time of the primary content for which corresponding supplemental content is being presented on the second screen 800. In some examples, the timeline 801 may include a second shaded portion (not shown), which may be a different color or shade from the shaded portion 802, to demonstrate where along the timeline 801 the primary content playing on the first screen device 301 is at.

In some examples, the supplemental content presented on the second screen 800 may be approximately synchronized with the primary content being presented on a first screen device 301 so that the supplemental content may change along with the primary content. In such cases, as the primary content progresses (e.g., as "The Voice" continues), the shaded portion 802 may extend in length to illustrate the time point of the show. For example, referring to FIG. 8, if the timeline 801 were synchronized with the playback of the primary content, the timeline 801 may indicate that the primary content has been playing for 24 minutes and 51 seconds. Although this time is shown in FIG. 8, this time might be approximated by the user based on the length of the shaded portion 802 and the time might not be shown or might only be shown upon request.

Notably, a user may interact with the timeline 801 to select different points in time along the timeline 801 thereby causing different portions of the supplemental content to be presented on the second screen 800. In other words, the timeline 801 does not have to stay synchronized with the primary content. Referring to FIG. 8, a user may move the rightmost edge of the shaded portion 802 to a point along the timeline 801 for which the user would like to consume (e.g., view) supplemental content. This may be done by selecting keys on the second screen device 302, selecting virtual keys on the second screen 800, using a finger or stylus where the second screen 800 is a touch-screen, etc. In this manner, the user can jump around to different points along the timeline 801 to see different portions of the supplemental content. However, when the user would like to return to a state where the supplemental content is synchronized with the primary content, the user may choose a resume key (not shown) that automatically adjusts the timeline 801 to return to the point in time of the corresponding primary content. Similarly, the user may also operate pause, play, fast-forward, rewind, and other keys (not shown) to adjust the timeline 801 and cause the presentation of the timeline's supplemental content to advance, fast-forward, rewind, or pause in a similar fashion as can be done with the primary video content. So in some embodiments, a user may have the option of dynamically viewing supplemental content during playback of the primary content, with the supplemental content synchronized to the playback of the primary content, while in other embodiments the user may have the presentation of supplemental content dynamically occurring on a schedule that is a few minutes ahead of the actual playback of the primary content (allowing the user a minute to view and digest the supplemental content before the corresponding time point in the primary content is played on the first screen).

Additionally, the timeline 801 may include markers 803 configured to mark certain points along the timeline 801. When a marker 803 is active (e.g., when the playback point in the primary content has reached the marker point in the timeline), it may cause a particular piece of supplemental content to be presented on the second screen. Referring to FIG. 8, the active marker is shown as a shaded marker 803s. It is this shaded marker 803s which causes the second screen 800 to present the quote shown as supplemental content. In some examples, there might be less supplemental content than primary content, and so the supplemental content may remain on the second screen 800 until it is appropriate to present the next piece of supplemental content. In other words, there may be varying intervals between the markers 803 of the timeline 801, so supplemental content corresponding to an active marker from among the markers 803 may be presented for a period of time until a next marker 803 becomes active. For example, in FIG. 8, the supplemental content corresponds to the shaded marker 803s (which is the most recently activated marker) although the shaded portion 802 of the timeline 801 shows that the primary content is at a point in time past the shaded marker 803s.

In FIG. 8, the markers 803 are illustrated as triangles; however, other shapes, colors, etc. may be used. In some embodiments, there may be two types of markers: first markers 803a and second markers 803b. First markers 803a may include markers created by an operator, a content creator, a content service provider, or some other administrative entity. In contrast, second markers 803b may include markers created by a user of the second screen device 302 presenting the timeline 801. In the example embodiment of FIG. 8, the first markers 803a are shown above the timeline 801, while the second markers 803b are shown below the timeline 801. In other embodiments, the first markers 803a and second markers 803b may appear on the reverse sides of the timeline 801. Alternatively, the first markers 803a and second markers 803b may be on the same side of the timeline and different colors or shapes may be used to distinguish them.

The timeline 801 of FIG. 8 may be presented on a plurality of second screen devices 302. For example, in a case where two different users are consuming similar content (e.g., the same episode of "The Voice") on a first screen device 301 and both users have the "Watch With Me" application running on their respective second screen devices 302, the second screen devices 302 may each present the timeline 801. Each timeline 801 may include the same first markers 803a, however, each timeline 801 may have different second markers 803b. As described further below, each timeline 801 may be modified. Modifications made with respect to the first markers 803a may impact each timeline 801, while modifications made with respect to the second markers 803b might only impact the respective timeline 801.

The first markers 803a may be pre-set and/or added in real-time. Where the first markers 803a are pre-set, the timeline 801 may include the first markers 803 when it is initially rendered by the second screen device 302. A provider of the primary content may know that a particular event will take place in the primary content at a particular point in time, and therefore, may create a marker 803 corresponding to that particular point in time that will trigger a specific portion of supplemental content to be shown in the second screen 800. For example, a provider of primary content may know that an actor will be driving a particular car at a certain time during a television program, and therefore, may create a marker 803 on the timeline 801 that causes a webpage, video, etc. that is related to the car to be presented on the second screen 800.

As mentioned above, the first markers 803a may also be added in real-time. An administrative entity may be designated to monitor live content to identify interesting events. The administrative entity may determine that a particular event has occurred within a piece of primary content, and may desire to supply additional supplemental content for that event. If so, the administrative entity may send a signal (or cause a signal to be sent) to a second screen device 302 presenting supplemental content for that primary content so that a first marker 803a may be added to the corresponding timeline 801. The administrative entity may also maintain a copy of the first markers 803a in its own memory, as well as information for the supplemental content (e.g., the application and/or image files for an interactive application that is to appear at the three minutes and ten seconds (3:10) mark in a television program) and information identifying how/ where the supporting files for the supplemental content may be retrieved, for presentation to users who request the same primary content in the future. As a result, when the added first marker 803a is selected, the second screen device 302 may be controlled to present a particular piece of supplemental content.

The second markers 803b may also be added by a user of the second screen device 302. When a user determines that an event in the primary content and/or the corresponding supplemental content is interesting, he/she may wish to mark that event. To accomplish this, a user may click/press on a part of the timeline 801 or a designated mark key 804, and as a result a second marker 803b may appear on the timeline 801 at a position corresponding to the current point in time in the primary content on the first screen device 301.

In this manner, a user may be able to identify supplemental content for later consumption. Users may find it desirable to mark supplemental content, for example, when the user is busy consuming the primary content and does not want to be distracted for the time being, but wants to take a look at the supplemental content in more detail later. Also, the second screen device 302 may be used to replay part, or all, of the primary content corresponding to any of the pieces of supplemental content, and the user may mark the timeline to indicate points in time of the primary content that he/she would like to view again at a later time.

In addition, second markers 803b may also be generated automatically in response to an action of the user. For example, a user may react to certain primary content or supplemental content by selecting an option to share the comment with one or more friends in a social network, and as a result, a second marker 803b may be added to the timeline 801 at a time corresponding to when the user shares the comment. For example, a user may select a share option 805 on the second screen 800 in response to reading the Cee-Lo quote shown in FIG. 8, and this selection may cause the second screen device to render a user input window 901 as shown in FIG. 9.

Figure 9:
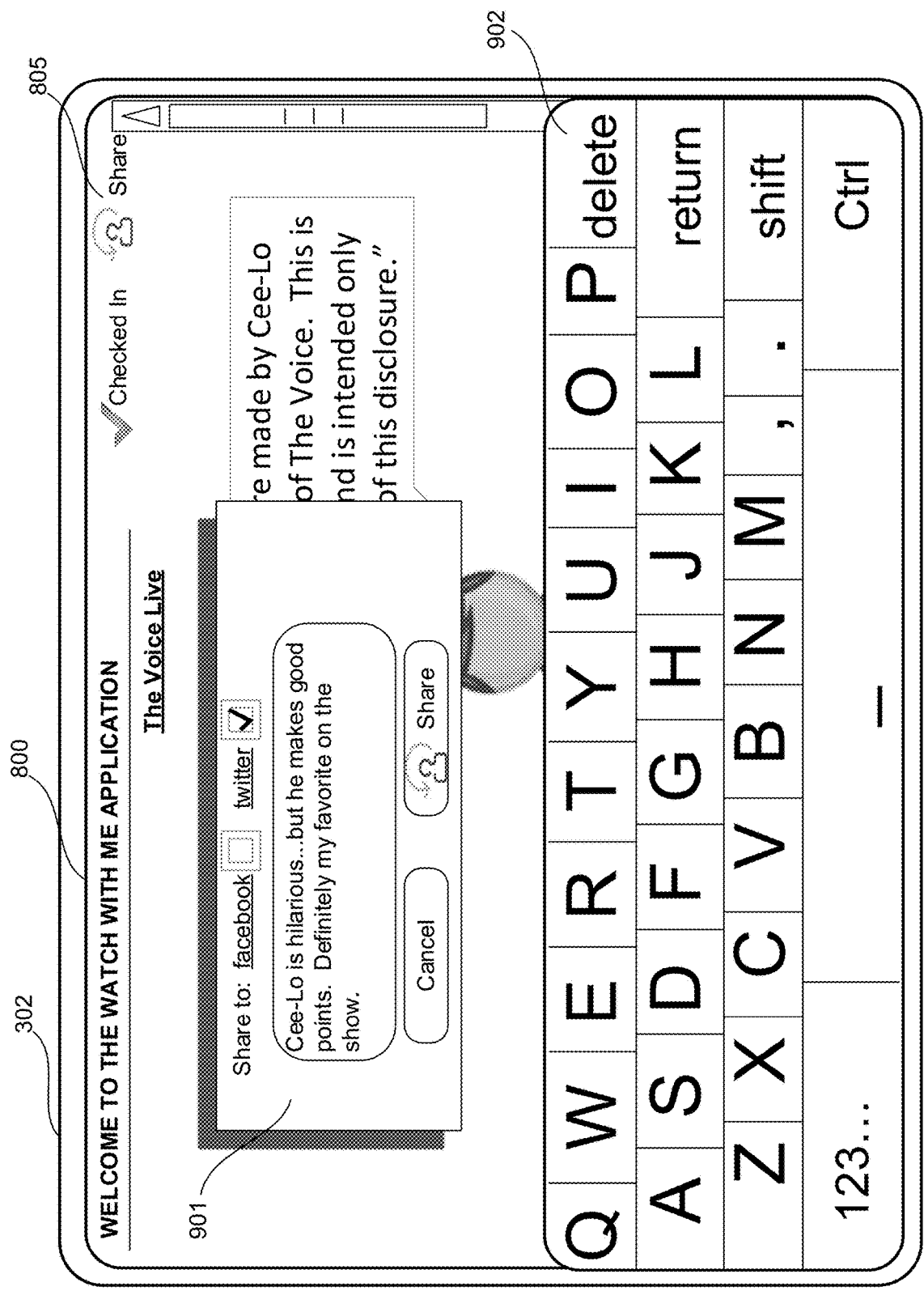
FIG. 9 is a diagram illustrating an example commenting user interface.

Referring to FIG. 9, the user input window 901 may pop-up onto the second screen 800, and overlay the supplemental content presented on the second screen 800. When the user input window 901 is shown, a keypad 902 may also be shown on the second screen 800. Using the keypad 902, a user may enter data (e.g., comments) into the user input window 901 in response to the supplemental content and/or an event within the primary content. The user may then choose to share the entered data with others. In some examples, the entered data may be shared through a social network service, such as FACEBOOK™, TWITTER™, TUNERFISH™, etc. For example, if the entered data is shared through FACEBOOK™, the entered data may appear as a wall post on a facebook page of the user. A user may choose which social network services he/she would like to share the entered data through. In some cases, the user may enter data once, and share that data through a plurality of social network services.

If the user enters and shares data, a second marker 803b may be added to the timeline 801 at a point in time when the user selected the share option 805. Notably, a user may enter data at multiple times thereby creating a plurality of second markers 803b along the timeline 801. As a result, the user may be able to subsequently review portions of the primary content and/or supplemental content that he/she entered data for (e.g., portions the user commented on). Thus, the timeline 801 may include a log of data entries.

Further, when a user is finished consuming primary and/or supplemental content (whether because the user has viewed all of the content or the user chooses to stop consuming the content), the first markers 803a and/or second markers 803b of the timeline 801 may be stored. The timeline 801 may be stored in a storage area on the second screen device 302 or in a storage area on the network 330 (e.g., in the second screen experience manager 340) to which the second screen device 302 is connected. If a user desires to view the timeline 801 at a later time (e.g., when watching a rerun of the primary content, or when resuming playback of the primary content via a DVR), the user may view the previous data he/she entered by selecting the second markers 803b. Users may also delete second markers 803b that they have created. A user may wish to delete a second marker 803b after he/she has reviewed the supplemental content thereof and does not want to review it again.

FIG. 8 illustrates an example of the second screen 800 when a play along option 806a is selected. When the play along option 806a is selected, the presentation of supplemental content may automatically progress in synchronization with the presentation of primary content on the first screen device 301, so that if the user presses pause on either the first screen (e.g., via remote control) or second screen device 302 (e.g., by tapping the play along option 806a again to deselect it), then both the presentation of the primary content on the first screen device 301, and the presentation of the supplemental content on the second screen, may be paused. When the play along option 806a is not selected, then the presentation of the primary content on the first screen and the supplemental content on the second screen may be independent of one another, and the second screen content does not advance automatically. Instead, the presentation of supplemental content on the second screen may be in response to user selection of markers 803a,b from the timeline. The play along option 806a, however, illustrates just one option of the second screen experience application. That is, other second screen options 806 may exist within the same application that may generate different second screens.

Figure 10:
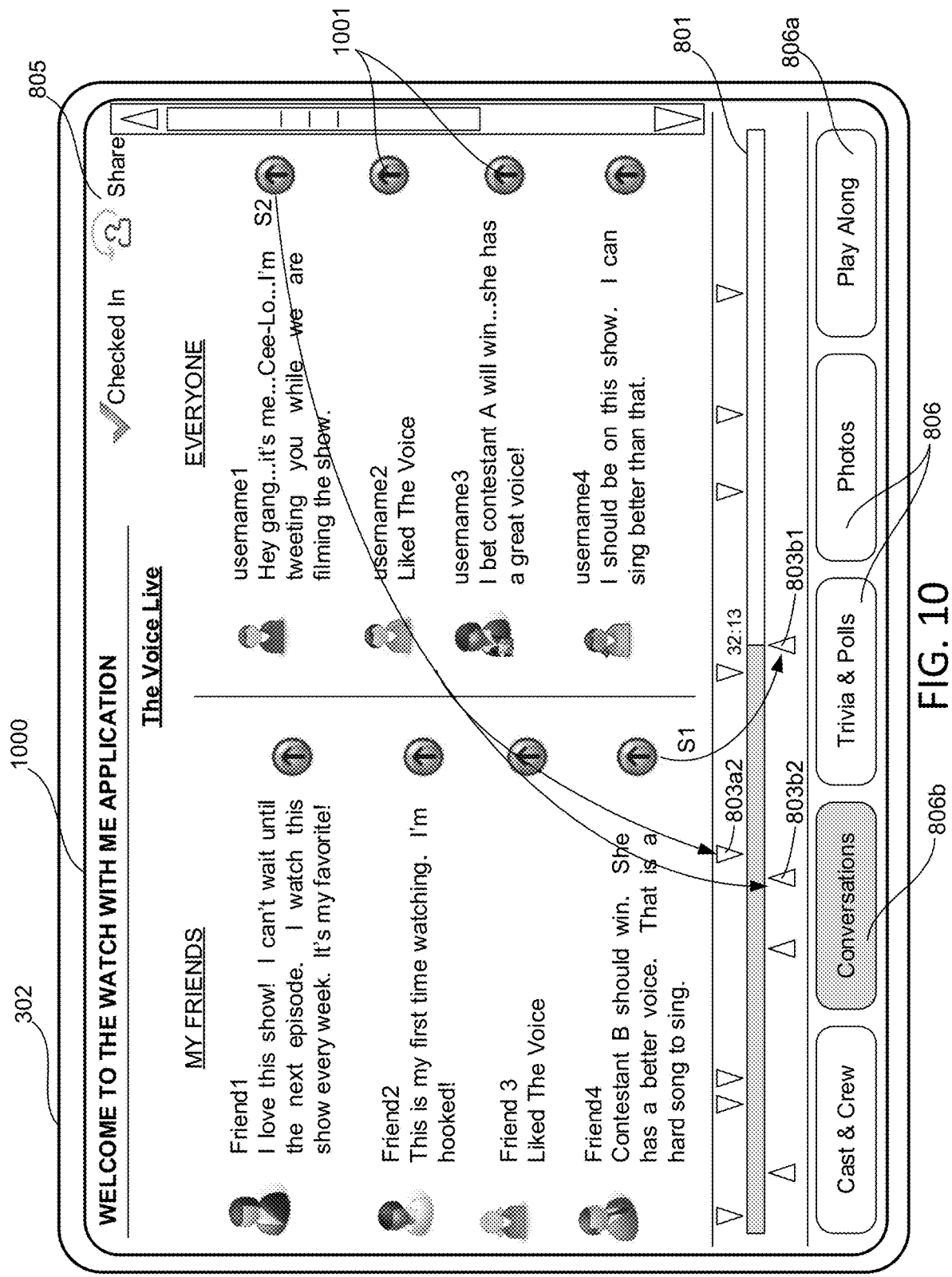
FIG. 10 is a diagram illustrating an example interaction user interface.

FIG. 10 illustrates an example second screen 1000 of the "Watch With Me" application that may be presented on a second screen device 302 when a conversations option 806b is selected. The "Watch With Me" application on the second screen device may receive messages through data feeds from social network services, such as FACEBOOK™, TWITTER™, TUNERFISH™, etc. and/or other news sources. The data feeds (or data transmissions) may include data entered by users registered through a social network service. For example, a TWITTER™ user may enter a message (e.g., a "tweet") and that message may be grabbed by the "Watch With Me" application and displayed on the second screen 1000. Notably, the "Watch With Me" application may grab certain messages depending on the primary content selected. For example, where "The Voice" is selected, the "Watch With Me" application may retrieve messages (e.g., "tweets") addressed at a particular show. Specifically, when "The Voice" is selected, the "Watch With Me" application may subscribe to a particular data feed for retrieving one or more messages with the "#TheVoice" hashtag. In another example, selecting "The Voice" may trigger the "Watch With Me" application to retrieve content on a particular YouTube™ channel.

As shown in FIG. 10, the "Watch With Me" application may sort the messages received. FIG. 10 shows that the messages may be sorted so that messages associated with usernames identified as friends appear on the left side while messages from the general public (e.g., "Everyone") appear on the right side. In some cases, the messages from the general public appearing on the right side may be filtered to reduce the number of messages presented so that the user is not overwhelmed if a large number of messages are received on the data feeds. This is just one example of the many ways that the messages may be sorted. User preferences, geographical location, demographic information, and time of day are a few examples of the different types of information that may be used to sort the messages.

Further, the messages may be ordered based on a time that they were entered through their respective social network services or based on a time that they are received by the "Watch With Me" application through the data feeds described above. As the messages are placed in order, they may also be assigned to a point on the timeline 801. In other words, the messages may be synchronized with the primary content and/or timeline 801. Thus, by adjusting the shaded portion 802 of the timeline 801, a user may cause the application to pan to a portion of the second screen 1000 showing the corresponding messages. For example, referring to FIG. 10, if a user shortens or extends the shaded portion 802 in the horizontal direction along the timeline 801, the application may scroll up or down in the vertical direction through the list of messages to present the corresponding messages.

Another aspect of the disclosure includes adding messages to the timeline 801. A user may want to mark one or more messages so that the user can refer back to the messages at a later time. To make this possible, the "Watch With Me" application may provide a post message option 1001 next to each message thereby allowing the user to select a message of interest to the user. When the user selects the message, a marker 803 may be added to the timeline 801. For example, referring to FIG. 10, a selection S1 of the post message option 1001 alongside of the message created by "Friend4" may cause the second marker 803*b*1 to be added to the timeline 801. Further, the second marker 803*b*1 generated as a result of the selection S1 may be added at a location on the timeline 801 corresponding to the point in time (within the presentation of the primary content) when the selected message was created. In some embodiments, by moving the shaded portion 802 to desired points on the timeline 801 and selecting post message options 1001, a user may control where on the timeline 801 the second marker 803*b*1 is added. As a result of these features, if a user at a time later in the primary content (e.g., perhaps at a commercial break towards the end of "The Voice") would like to see the message by "Friend4" again, the user may select the first marker 803*b*1. This may cause the second screen 1000 to scroll to the point in the list of messages where the message by "Friend4" exists or may cause a pop-up window (not shown) to appear with the message by "Friend4" inside.

Notably, the user may create a second marker 803*b* for any message on the second screen 1000. For example, referring to FIG. 10, a selection S2 of the post message option 1001 alongside of the message created by "username1" may cause a second marker 803*b*2 to be added to the timeline 801. FIG. 10 also shows that the selection S2 may cause a first marker 803*a*2 to be created. As mentioned above, the first markers 803*a* shown on top of the timeline 801 may be added in real-time by an administrative entity. If a number of people select the same message or certain people (e.g., a celebrity) select a message, the administrative entity may determine to add a first marker 803*a* to make notice of the message so that everyone using the timeline 801 may be alerted to the message. Essentially, the administrative entity can decide that certain messages should be featured. The determination by the administrative entity may be a manual determination made by a group of people belonging to the administrative entity or automatically by a computing device 200 on behalf of the administrative entity. In the case that the determination is made automatically, the computing device 200 may detect how many times each message is selected, and compare the number of times to a predetermined threshold. If the number of times a message is selected exceeds the threshold, the computing device 200 may push instructions to the second screen device 302 (or store the instructions at a designated location from which the second screen device 302 may pull data) to cause the "Watch With Me" application to add a first marker 803*a* corresponding to the message, and the computing device 200 may update its own stored copy of the timeline 801 to reflect the addition. In some cases, instead of automatically pushing the instructions to the second screen device 302 (or storing the instructions to a designated location), the computing device 200 may flag the message that has been selected a number of times and send the message to one or more individuals of the administrative entity who may make the final determination of whether to feature the message and push the instructions to the second screen device 302.

FIG. 10 illustrates this concept of adding first markers 803*a* for certain messages. As shown in FIG. 10, if a number of people select the post message option 1001 alongside the message of "username1," the first marker 803*a*2 may be also be created on the timeline 801. Notably, the first marker 803*a*2 may appear on the timeline 801 even when the user does not make the selection S2, if a number of other users selected the message of "username1" Accordingly, the system may draw the user's attention to messages that are more popular than others or messages from certain individuals that the user might not otherwise notice.

Referring to both FIGS. 8 and 10, the quote by Cee-Lo shown on the second screen 800 of FIG. 8 may be the result of a first marker 803*a* added to the timeline 801 by an administrative entity in response to detecting a number of selections of the message by "username1" (which may be identified as Cee-Lo's username) More specifically, the administrative entity, or computing device 200 thereof, may have determined that username1's message is popular and should be featured. The administrative entity, or computing device 200 thereof, may package the message along with an image of Cee-Lo so that the package, when transmitted to the second screen device 302, may allow the "Watch With Me" application to present the image and a callout box containing the message. The "Watch With Me" application may be include a number of preset templates, and may be configured to populate those templates with the data provided by the administrative entity.

In FIG. 10, the timeline 801 shows the same first markers 803*a* that were shown in the timeline 801 of FIG. 8, despite the fact that the screens of FIGS. 8 and 10 show different supplemental content (FIG. 8 shows a celebrity quote in the when the play along option 806*a* is selected, while FIG. 10 shows friend discussions when the conversations option 806*b* is selected). As such, the same timeline 801 may be presented by the "Watch With Me" application regardless of which second screen option 806 is chosen. However, in other embodiments, the first markers 803*a* shown on the timeline 801 may change according to the selected second screen option 806. For example, in another case, the timeline 801 of FIG. 10 might only show first markers 803*a* that correspond to messages since the conversations option 806*b* is selected. Similarly, the timeline 801 of FIG. 10 might only show second markers 803*b* that correspond to messages that the user selected since the conversations option 806*b* is selected.

Figure 11:
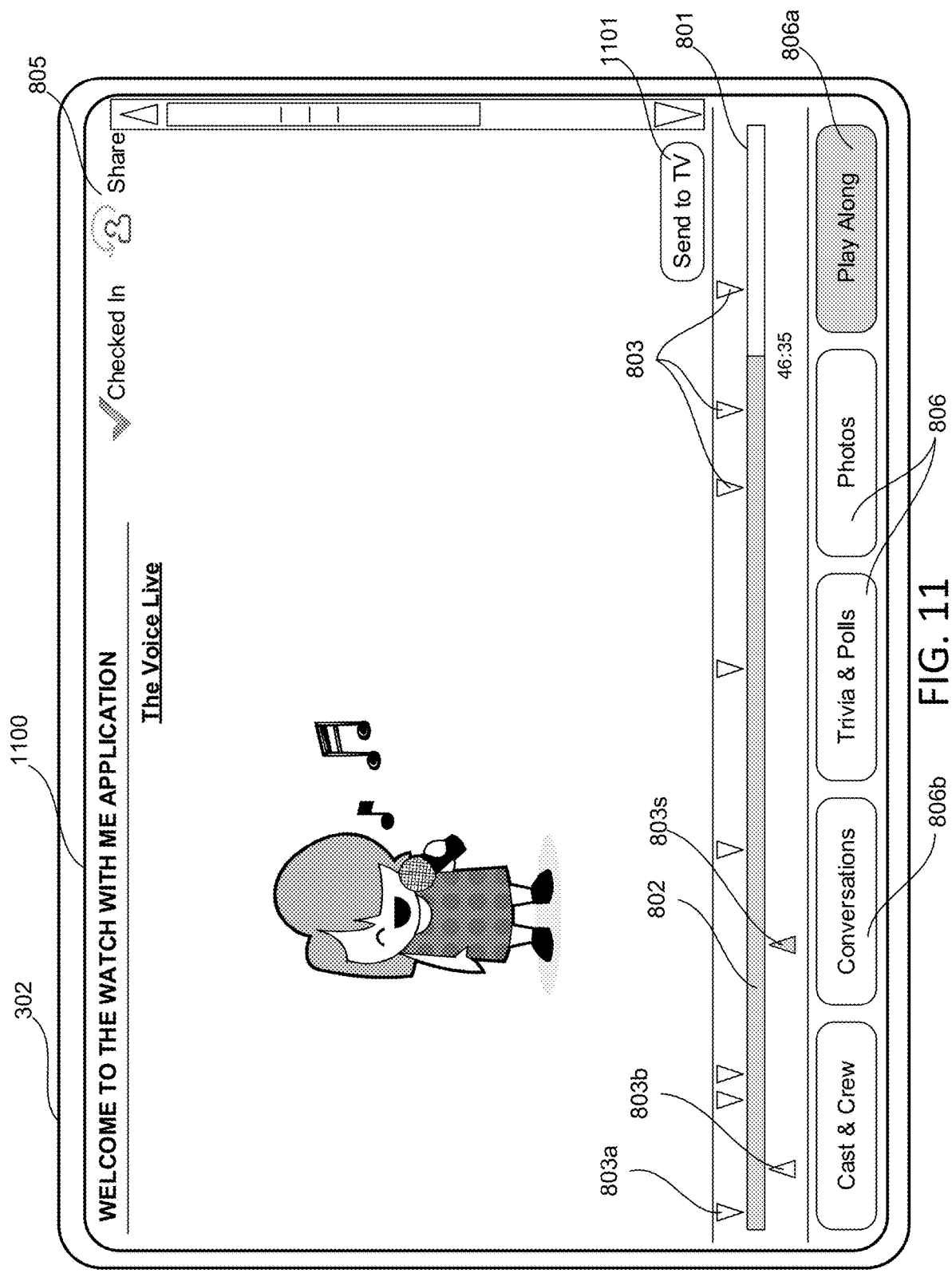
FIG. 11 is a diagram illustrating an example user interface.

FIG. 11 illustrates an example second screen 1100 in which a user has selected to go back and watch a particular segment of the primary content that has already been presented or aired live. For example, the primary content may be presenting a block of commercials, and the user may decide that he/she would like to watch an earlier segment of the primary content that he/she marked. When a user first creates a marker 803, a recording command signal may be sent to a digital video recorder (DVR) or a recording server, which may be a computing device 200 on the network 330 (or in the local office 103), to instruct the DVR or recording server (whichever is used) to record (or buffer) a portion of the primary content being presented on the first screen device 301. In some examples, the portion to be recorded may have a predetermined duration.

Referring to FIG. 11, the shaded portion 802 of the timeline 801 represents that the first screen device 301 is playing a portion of "The Voice" that is 46 minutes and 35 seconds (46:35) from the beginning. At that time, a block of commercials may be playing on the first screen device 301, and therefore, the user may wish to view an earlier segment of the "The Voice" corresponding to one of the second markers 803*b*. Accordingly, the user may select a desired second marker changing it to a shaded marker 803*s*. In response to this selection, the second screen 1100 may present the corresponding supplemental content, which may be a re-presentation of an earlier segment of "The Voice." The desired portion to be re-presented may have been buffered in the user's own DVR, or it may have been stored remotely at a recording server. In cases where the portion to be re-presented is buffered in the DVR or recording server and desired to be viewed on the second screen device 302, the DVR or recording server (whichever is set up to record the primary content and support this feature) may transmit the desired portion to the second screen device 302 upon receipt of a request for consuming the desired portion. This request may include an indication of the first screen device 301, the second screen device 302 to which the desired portion should be sent, the user or a user account, the primary content, a time point for playback, and/or a duration for playback, so that the second screen device 302 may receive the correct portion that is desired to be re-presented.

In some cases, the user may wish to play the desired portion on the first screen device 301 (e.g., a television). If so, the user may select a send-to-tv option 1101 on the second screen 1100. This selection of the send-to-tv option 1101 may cause the second screen device 302 to send a signal, including an indication of the first screen device 301, the user or a user account, the desired content, a time point for playback, and/or a duration for playback, to the DVR or recording server (whichever is set up to record the content and support this functionality). In turn, the signal may cause the DVR or recording server to check whether it has recorded the desired portion, and if so, to jump back to a point in time to play the desired portion. Alternatively, the DVR or recording server that receives this signal may set up a new stream containing the desired portion of primary content, and send a command to a computing device 200, such as the DVR, interface 120, or first screen device 301, to force the computing device to tune to the new service/channel carrying the stream. As a result, the first screen device 301 may re-present the desired portion of the primary content. After the desired portion is re-presented, the computing device 200 may tune back to the service/channel carrying the primary content that was being presented before the signal was received from the second screen device. While the first screen device 301 is re-presenting a desired portion of the primary content, the DVR or recording server may record (or buffer) the primary content being missed so that when the user is tuned back to the service/channel carrying the primary content, the user may consume the content from the point in time where he/she left off before tuning away to consume the re-presented portion.

In some embodiments, the user may wish to play other types of supplemental content (other than re-presentations of the primary content) on the first screen device 301 (e.g., a television). If so, the user may select the send-to-tv option 1101 on the second screen 1100. The "Watch With Me" application may present the send-to-tv option 1101 for certain pieces of supplemental content. When the send-to-tv option 1101 is selected, the "Watch With Me" application may cause the second screen device 302 to communicate with a first screen device 301 or computing device 200 connected thereto (e.g., interface 120). The second screen device 302 may then transmit the supplemental content via a wired or wireless connection (e.g., WiFi) to the first screen device 301 or an interface connected to the first screen device 301 thereby causing the first screen device 301 to play the supplemental content. Once the supplemental content finishes playing, the first screen device 301 may return to the primary content. In some embodiments, the "Watch With Me" application will cause the second screen 1100 to present the primary content (which may include commercials) or a related version of the primary content (e.g., a logo of an advertiser whose commercial would have been shown on the first screen device 301 as part of the primary content if the first screen device 301 were not presenting the supplemental content), while the first screen device 301 is presenting the supplemental content.

Figure 12:
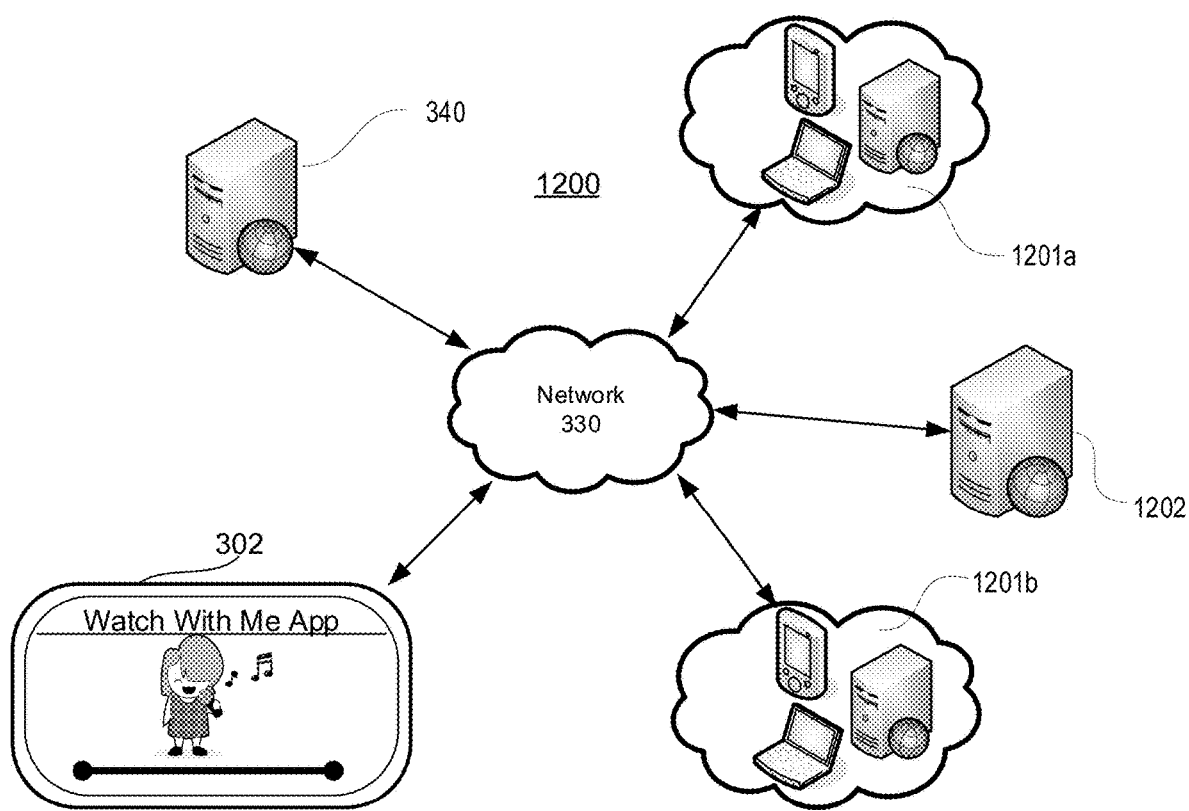
FIG. 12 illustrates a system architecture according to one or more aspects described herein.

FIG. 12 illustrates an example configuration of a system 1200 for realizing some of the features of the "Watch With Me" application described above. As shown, the "Watch With Me" application may be executed on a second screen device 302 of the system 1200. The system 1200 may also include the second screen experience manager 340, one or more social network services 1201, and one or more news sources 1202.

The one or more social network services 1201 may include FACEBOOK™, TWITTER™, TUNERFISH™, etc. Each social network service 1201 may include any computing device 200, such as personal computers, laptops, tablets, smartphones, PDAs, servers, etc. Any computing device 200 on which a user is signed-in or logged-in may be considered to belong to the social network service 1201. For example, a user may sign-in to the social network service 1201*a* using a tablet, and that tablet may be considered to belong to the social network 1201*a* as long as the user is signed-in on that tablet. Indeed, the second screen device 302 in FIG. 12 may also be considered to belong to one or more of the social network services 1201 depending on whether the user has signed-in using the second screen device 302.

The one or more news sources 1202 may include any computing device 200 configured to supply a data feed, such as a rich site summary (RSS) feed. Accordingly, a news source 1202 may include a server that hosts a webpage or website from which a data feed may be received. For example, a news source 1202 may include a website which presents blog posts and broadcasts blog posts through an RSS feed.

The second screen experience manager 340 may be configured to communicate with one or more of the social network services 1201 and news sources 1202 via the network 330 (e.g., the Internet). Specifically, the second screen experience manager 340 may be configured to receive one or more data feeds from each of the one or more social network services 1201 and news sources 1202. Accordingly, the second screen experience manager 340 may include an aggregator, such as an RSS reader, to receive and read the data feeds. One or more uniform resource identifiers (URIs) may be provided to the aggregator to configure the aggregator to subscribe to certain data feeds. These URIs may be provided by an administrative entity or other operator of the second screen experience manager 340 such that the data feeds may be subscribed to whether or not users have requested supplemental data from the data feeds. Alternatively, URIs may be provided in response to a request for supplemental content. For example, referring to FIG. 10, when a user navigates to a conversations option 806b to view messages related to "TheVoice," the second screen device 302 may send a request for such messages to the second screen experience manager 340 causing an aggregator therein to be configured with a particular URI for subscribing to a data feed supplying messages related to "TheVoice."

Further, the second screen experience manager 340 may be configured to analyze the data feeds and organize the data. Table 2 below illustrates an example of the various associations that may be created as a result of organizing the data.

TABLE 2

| Social Network Service | Timestamp | Message | Popularity Score of Message | Username | Subject Matter ID | Primary Content |
|---|---|---|---|---|---|---|
| Facebook ™ | 12/7 @ 7:33pm | Liked | Liked by 2,231 | username1 | The Voice facebook page | The Voice |
| Twitter ™ | 12/7 @ 7:34pm | What a great show . . . | Retweeted 1,043 | username2 | #TheOffice | The Office |
| Twitter ™ | 12/7 @ 7:34pm | I love her voice . . . | Retweeted 465 | username3 | #TheVoice | The Voice |
| tunerfish ™ | 12/7 @ 7:34pm | Best episode yet . . . | Approved by 988 | username4 | The Voice tunerfish page | The Voice |

The data in Table 2 is provided to illustrate various aspects related to how the second screen experience manager 340 might organize various types of data. Here, organizing may include storing the various types of data in association with each other. The second screen experience manager 340 may include a database, or be coupled to a database, configured to store the various types of data in association with each other. Referring to Table 2, the "Social Network Service" column may include information identifying one of the social network services 1201. This information may be obtained based on information in the data feed indicating the source of the data feed. For example, where the data feed includes IPv4 or IPv6 packets, this information may be determined based on the source address. The "Timestamp" column may include a timestamp indicating a date and time for associated information received by the second screen experience manager 340 through the various data feeds. The timestamp may represent a time the associated information is received, or a time supplied by the social network service 1201 indicating a time that the associated information was generated or transmitted. Notably, the second screen experience manager 340 may be configured to receive information from different data feeds in parallel, and thus, different data may have the same or approximately the same timestamp. The "Message" column includes information entered by a user (e.g., a "tweet" on TWITTER™) or generated in response to a user action (e.g., selecting a "like" key on FACEBOOK™) through one of the social network services 1201, and forwarded to the second screen experience manager 340 through one of the data feeds. Although shown as text in Table 2, the message may include images, audio, video, etc. The "Popularity Score of Message" column may include a score (or other valuation) indicating how popular a particular message might be. The second screen experience manager 340 may analyze the messages to compute this score. Such analysis may include tallying a number of times that a message was retransmitted (e.g., retweeted) or a number of times a message was approved (e.g., liked). This popularity score may be used to determine whether messages are made accessible through the "Watch With Me" application at all or included in the timeline 801 as featured content, as disclosed herein. The "Username" column may include usernames identifying the users of the different social network services 1201 who originally created the message information received. Information regarding the username may be received in association with the respective message information through the data feeds. The "Subject Matter ID" column may include information identifying the subject matter that the message is directed to. In a case that the social network service is FACEBOOK™, the subject matter ID information may indicate a FACEBOOK™ page that was "liked." In comparison, in a case that the social network service is TWITTER™, the subject matter ID information may indicate a hashtag (e.g., "#TheVoice" hashtag) of the message. The subject matter ID information may also be received in association with the respective message and username through the data feeds. Lastly, the "Primary Content" column includes data identifying related primary content that the second screen experience server 340 may generate based on data in one of the other columns. For example, based on the subject matter ID indicating a FACEBOOK™ page of "The Voice," the second screen experience server may determine that the message (e.g., liked) is related to the television program called "The Voice."

In addition to communicating with the social network services 1201 as described above, the second screen experience manager 340 may communicate with the second screen device 302 executing the "Watch With Me" application. When the "Watch With Me" application is launched, it may cause the second screen device 302 to connect to the second screen experience manager 340 via the network 330. The second screen device 302 may send signals to the second screen experience manager 340 indicating which primary content is being consumed and/or requesting specific supplemental content. Further, the second screen experience manager 340 may transmit data, which it receives from the social network services 1201, to the second screen device 302. For example, the second screen experience manager 340 may determine that the second screen device 302 should receive supplemental content related to "The Voice." Then, the second screen experience manager 340 may perform a search on the information it received from the data feeds and stored by searching for data associated with primary content indicating "The Voice," and may transmit the search results to the second screen device 302 so that the second screen device 302 may present a screen such as the second screen 1000 of FIG. 10.

Notably, the second screen experience manager 340 may continue to send data (e.g., messages) to the second screen device 302 so that the second screen device may present the second screen 1000 with the most recent messages. Meanwhile, the second screen experience manager 340 may receive reports from the second screen device 302. Such reports may indicate selections of desired supplemental content, which the second screen experience manager 340 may provide in response. Additionally, or alternatively, such reports may indicate selections made by the user. For example, the "Watch With Me" application may cause the second screen device 302 to report that a user has selected a particular message (e.g., a user has made selection S1 in FIG. 10). Using this information along with similar information in reports received from other second screen devices 302, the second screen experience manager 340 may determine whether a particular message has been selected by a certain number of different users. Therefore, the second screen experience manager 340 may, to some degree, monitor user inputs on the second screen device 302. The second screen experience manager 340 may forward the results of its monitoring to an administrative entity or may automatically make decisions to generate new markers 803 for the timeline 801. In any event, the second screen experience manager 340 may eventually transmit data including instructions to the second screen device 302 that, when interpreted by the "Watch With Me" application, may cause the "Watch With Me" application to modify the timeline 801 to include a new marker. Moreover, the received data may also include the message or other information to be presented in a case where the added marker is selected.

Figure 13:
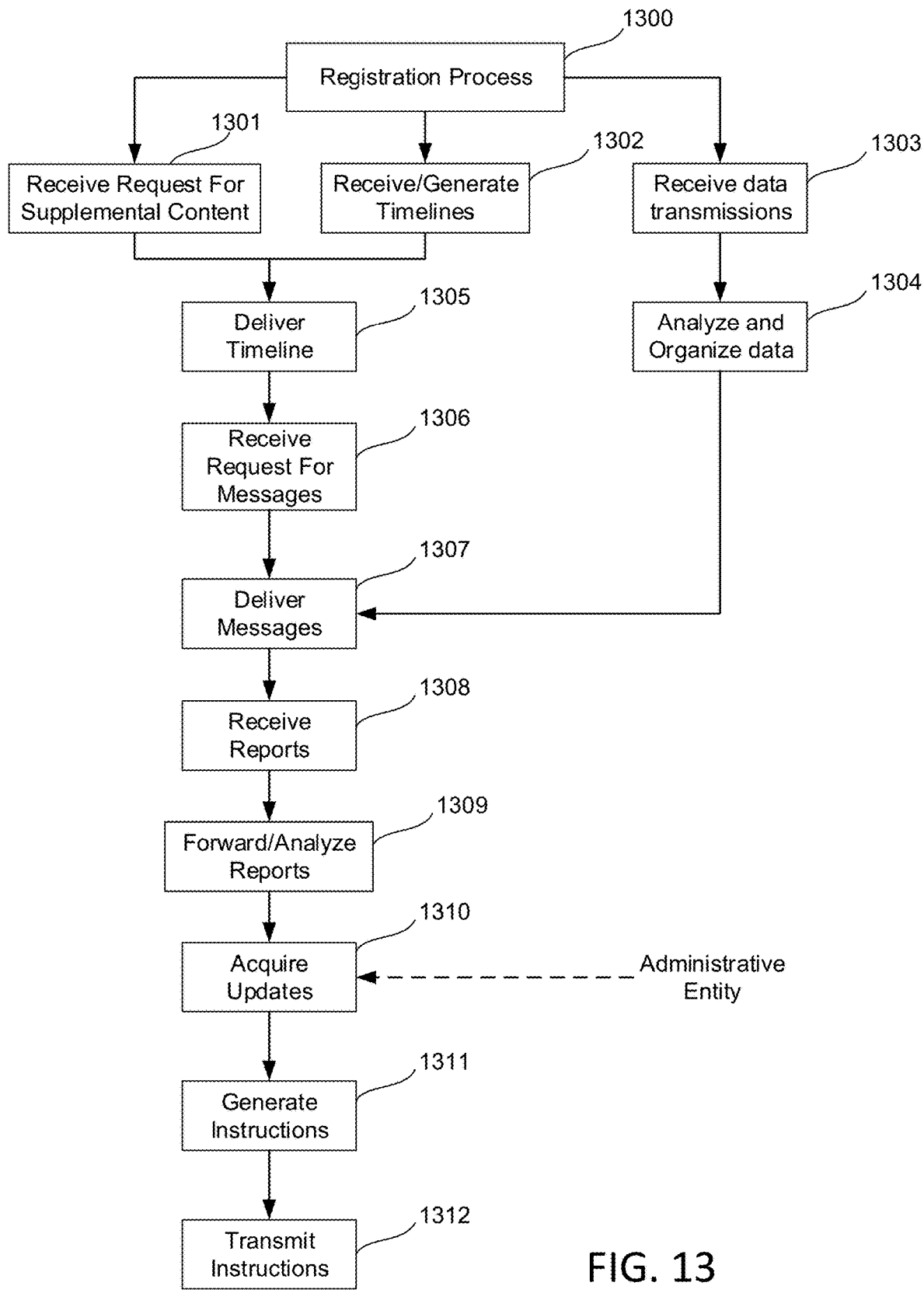
FIG. 13 is a flow diagram illustrating an example method according to one or more aspects of the disclosure.

FIG. 13 is a flow diagram illustrating an example method of modifying the timeline and presenting messages from data feeds related to a particular piece of primary content. FIG. 13 also illustrates how information from reports related to the messages may be used to modify the timeline. With respect to the flow diagram of FIG. 13, the steps are discussed below, for illustrative purposes only, as being performed by or in association with the second screen experience manager 340. However, in other embodiments, one or more of the steps may be performed by another computing device, e.g., device 200, configured to connect to the network 330 and communicate with second screen devices 302, social network services 1201, and news sources 1202.

In step 1300, the second screen experience manager 340 may register a second screen device 302 and/or a user associated with the second screen device 302. This registration process may include providing a supplemental content presentation application, such as the "Watch With Me" application, to a second screen device 302. Further, this registration step may include receiving information (e.g., a username, password, device ID, etc.) for setting up a user account. When setting up a user account, a user may specify user preferences that may determine which timelines and/or which supplemental content are subsequently provided to the user. For example, a user may specify his/her age, gender, interests, etc. so that he/she receives a timeline with certain pre-configured markers appropriate for that user. As a result, for example, one user may receive a first timeline with first supplemental content for a particular piece of primary content, while another user may receive a second timeline with second supplemental content for the same piece of primary content.

In addition, while setting up a user account, a user may also provide information related to social network services 1201 of the user for configuring the second screen experience manager 340 to access the social network services 1201. Since the second screen experience manager 340 may access the social network services 1201, a user may submit comments (or other data) to his/her social network services 1201 through the "Watch With Me" application running on a second screen device 302. For example, comments may be sent from a second screen device 302 to the second screen experience manager 340, which may then forward the comments to a server of the social network service 1201 along with information stored in the second screen experience manager 340 for authenticating the user to the particular social network service 1201. Further, setting up a user account may configure the second screen experience manager 340 to store usernames of friends, family, or other persons of interest in association with the user account, so that the second screen experience manager 340 may filter messages and send selected messages to a second screen device 302 associated with the user account.

Once a user account is set up, a second screen device 302 may be configured to interact with the second screen experience manager 340 so that the remaining steps of FIG. 13 may be performed. For example, the registration process of step 1300 may configure the second screen experience manager 340 to push timelines 801 in step 1305, messages in step 1307, or instructions in step 1312 to registered second screen devices 302.

In step 1301, the second screen experience manager 340 may receive one or more requests for supplemental content. The requests may be received from one or more first screen devices 301 or from one or more second screen devices 302. Specifically, a second screen device 302 may send a signal requesting a particular piece of supplemental content related to a particular piece of primary content, such as an episode of "The Voice." In response to receiving the request, the second screen experience manager 340 may store an identifier identifying the second screen device 302 in association with information identifying the requested supplemental content.

In step 1302, the second screen experience manager 340 may receive or access one or more timelines 801. The timelines 801 may be provided by content creators (e.g., television show producers), the local office 103, or other approved entities. In some embodiments, the second screen experience manager 340 may generate one or more timelines 801. For example, the second screen experience manager 340 may use predefined code to set up a timeline 801 for a particular piece of content. More specifically, the second screen experience manager 340 may determine when a timeline 801 is not available for a particular piece of content, and in response, may create a new instance of a module (which may include one or more classes, such as Java classes) of computer-executable instructions designed to present a timeline 801. In some examples, the second screen experience manager 340 may use a content listing (e.g., program guide 400) to determine that a particular piece of content is new, and therefore, that a timeline is not yet available and should be generated.

In addition to creating a new instance of a module for a new timeline 801, the second screen experience manager 340 may also automatically add supplemental content to the timeline 801. In some examples, second screen experience manager 340 may perform audio and/or image recognition processes on the content for which the timeline 801 is created and may add supplemental content according to the results of those processes. For example, audio recognition processes may be performed on the audio data of the content to determine that an actor in the content refers to a brand of clothing. As a result, the second screen experience manager 340 may add a link to a website for that brand of clothing into the timeline 801. Specifically, the second screen experience manager 340 may create a first marker 803a at a point along the timeline 801 representing a time when the actor referred to the brand of clothing so that that first marker 803a, when selected, may cause a link to the website for that brand of clothing to be presented on a second screen device 302. Similarly, image recognition processes may be used to identify images of an item within the video data of the content so that links to websites selling that item may be added to the timeline 801. Additionally, or alternatively, supplemental content may be automatically added to the timeline 801 based on the identity of the content for which the timeline 801 is being created. That is, based on the identity of the content, the second screen experience manager 340 may determine that predetermined supplemental content associated with that content should be added to the timeline 801. For example, where the content is an episode of "TheVoice," the timeline 801 may add one or more first markers 803a providing additional information about one or more characters (e.g., Cee-Lo) known to be featured in the content. In another example, YouTube™ content on a particular channel known to be associated with the identified content may be incorporated into the timeline 801. In some cases, automatically added first markers 803a may be inserted into the timeline 801 at points corresponding to known commercial breaks within the content so as not to disrupt a user's consumption of the content.

In step 1303, the second screen experience manager 340 may receive one or more data transmissions from social network services 1201 and/or news sources 1202 as described above. As shown in FIG. 13, steps 1301, 1302, and 1303 may be performed in parallel. Thus, the second screen experience manager 340 may receive a data feed at the same time that it receives a timeline 801 or request for supplemental content. While steps 1301, 1302, and 1303 may be performed in parallel and at the same time, this is not a requirement and the second screen experience manager 340 may perform each step whenever it receives the respective data. Moreover, it should be understood that steps 1301, 1302, and 1303 may be performed continuously or at periodic or variable intervals.

In step 1304, the data from the data transmissions may be analyzed and organized as described above. Like step 1303, step 1304 may be performed continuously or at intervals to organize the data from the data feeds as it is received.

In step 1305, an appropriate timeline 801 (either received, accessed, or generated) may be transmitted/delivered to the second screen device 302 that sent the request received in step 1301. The appropriate timeline 801 may be determined based on information within the request identifying the content for which supplemental content is desired or identifying the supplemental content itself. Here, delivering a timeline 801 may include sending data for the timeline 801 and indicating that the timeline data is for a timeline 801 so that a supplemental content presentation application (e.g., the "Watch With Me" application) running on a second screen device 302 may configure the timeline 801. In some embodiments, step 1305 may include multicasting one or more timelines 801 to all second screen devices 302 in communication with the second screen experience manager 340 using one or more multicast signals. In such embodiments, each of the second screen devices 302 may determine whether to buffer and/or present the timelines 801. Where timelines 801 are broadcasted, step 1307 might not be performed in response to step 1306, and instead, step 1307 may transmit messages continuously or intermittently.

Delivering an appropriate timeline 801 at step 1305 may include delivering a version of the timeline based on a type of receiving device and/or user preferences. There may be multiple timelines 801 for the same piece of content that are designed for different types of devices. For example, a smartphone may receive one version of the timeline 801 while another type of device (e.g., a tablet) may receive another version of the timeline 801. The version of the timeline 801 delivered to the smartphone might have a smaller layout than the version of the timeline 801 delivered to the other type of device. Alternatively, the version delivered to the smartphone may have a vertical layout as opposed to a horizontal layout that is used in the version sent to the other type of device.

In step 1306, the second screen experience manager 340 may receive a request for messages related to a particular piece of content. For example, referring to FIG. 10, a user may select a conversations option 806b. This may selection may trigger the second screen device 302 to send a request for messages related to a particular piece of content. In the case of FIG. 10, where the "Watch With Me" application is set to present supplemental content for "The Voice," the request for messages may request messages related to "The Voice." Therefore, the request may include information identifying the content for which messages are requested.

In response to receiving the request at step 1306, the second screen experience manager 340 may deliver the messages at step 1307. Specifically, the second screen experience manager 340 may search a database or other storage area for messages related to the content identified in the request. In cases where the data from the data feeds are analyzed and organized in step 1304, the messages may be more easily found by searching for the messages using information identifying the content. In some embodiments, step 1307 may include broadcasting messages to all second screen devices 302 in communication with the second screen experience manager 340 using one or more multicast signals. In such embodiments, each of the second screen devices 302 may determine whether to buffer and/or present the messages. Where messages are broadcasted, step 1307 might not be performed in response to step 1306, and instead, step 1307 may transmit messages continuously or intermittently.

Further, in some embodiments, step 1303 might not be performed until the request for messages is received at step 1306. That is, the second screen experience manager 340 might wait until it receives a request for messages related to a particular piece of content, and then may subscribe to a data feed that provides messages for that particular piece of content. In such embodiments, the delivering of messages in step 1307 may include subscribing to a particular data feed based on the request, receiving messages from that data feed, and delivering those messages.

In step 1308, the second screen experience manager 340 may receive reports from one or more second screen devices 302. As described above with respect to FIG. 12, reports may be sent to indicate that a user has selected a particular message. The report may identify the particular message selected and the user who selected the message, as well as, other information about the user (e.g., geographical location of user, age of user, etc.). Then, at step 1309, the second screen experience manager 340 may forward the report to an administrative entity which may determine whether the message identified in the report warrants the addition of a first marker 803a to the timeline 801 so that the message may be featured as described above with reference to FIG. 12. Additionally, or alternatively, the reports may be analyzed by the second screen experience manager 340, which may automatically determine if a threshold number of reports identifying the same selected message are received.

In step 1310, the second screen experience manager 340 may acquire updates to the timeline 801. That is, the second screen experience manager 340 may acquire a command indicating that one or more first markers 803a should be added to the timeline 801 so that a corresponding piece of supplemental content is shown when each of the first markers 803a is selected. These update commands may include the supplemental content to be added, a timestamp indicating a location in the timeline 801 where a marker for the supplemental content should be added, and information identifying the corresponding content so that the correct timeline 801 is updated. Further, these update commands may be received from an administrative entity or acquired from the second screen experience manager 340 itself when the second screen experience manager 340 automatically analyzes the reports in step 1308. For example, an administrative entity monitoring a particular piece of content in real-time may detect that an event occurred within the content and may decide to provide supplemental content in response to that event. If so, the administrative entity may provide the supplemental content along with a command to the second screen experience manager 340 so that the second screen experience manager 340 may modify the timeline 801 accordingly. In another example, the administrative entity (or the second screen experience manager 340 itself) may determine that a particular message should be featured, and may provide supplemental content, including the message, along with a command to the second screen experience manager 340 so that the second screen experience manager 340 may modify the timeline 801 accordingly. While FIG. 13 illustrates that step 1310 may be performed in response to results of the analysis at step 1309, FIG. 13 also includes a dotted line arrow to illustrate that updates may be acquired at any time from an administrative entity, which may monitor content in real-time and choose to create updates to modify timelines 801.

In step 1311, the second screen experience manager 340 may generate instructions that cause a second screen device 302 to modify a timeline 801. For example, when a command is received from an administrative entity in step 1310, the second screen experience manager 340 may generate instructions that cause the second screen device 302 to add a first marker and corresponding supplemental content to the timeline 801. These generated instructions may include computer-executable instructions that the second screen device 302 may process or may provide information that directs the second screen device 302 to execute computer-executable instructions therein. In the latter case, the information may include the supplemental content to be added, a timestamp indicating a location in the timeline 801 where a marker 803 for the supplemental content should be added, and/or information identifying the corresponding content so that the correct timeline 801 is updated. In the former case, the computer-executable instructions may include this information as well as a script or other module of code that, when executed, may instruct the "Watch With Me" application on how to modify its timeline 801 to present the additional supplemental content.

In step 1312, the generated instructions may be transmitted to a second screen device 302. In some cases, the generated instructions may be pushed to the second screen device 302 once they are generated. Thus, second screen devices 302 might not need to request updates in order for the timeline 801 to stay up to date with the latest supplemental content. Alternatively, once the instructions are generated, they may be stored for transmission upon a subsequent request for updates. For example, the instructions may be stored in a memory of the second screen experience manager 340 until the second screen experience manager 340 receives a request from a second screen device 302 for updates to its timeline 801, at which point the second screen experience manager 340 may transmit the appropriate instructions.

Although not shown, it should be understood that one or more of the steps in FIG. 13 may be performed numerous times. For example, after step 1312 the process may return to step 1301 to receive another request for supplemental content. The subsequent request may be for similar supplemental content as previously requested (e.g., supplemental content related to the same primary content as the previously requested supplemental content) or for new supplemental content related to different primary content than the previously requested supplemental content. Also, in various circumstances, some steps of FIG. 13 may be performed more times than others. For example, the second screen experience manager 340 may receive more reports than requests for messages, and therefore, may perform step 1308 more often than step 1306.

Although example embodiments are described above, the various features and steps may be combined, divided, omitted, and/or augmented in any desired manner, depending on the specific secure process desired. For example, the process of FIG. 7 may be modified so that step 704 is not performed, and thus, the items are not arranged in an order. Or, for example, the process of FIG. 13 may be modified such that the data received through the data feeds at step 1303 is not received until after a request for messages is received in step 1306. This patent should not be limited to the example embodiments described, but rather should have its scope determined by the claims that follow.

The invention claimed is:

1. A method comprising:
   determining, by a computing device and based on information indicating selection of a content item for output via a first screen device, one or more applications related to the content item;
   causing output, via the first screen device, of the content item and an icon, wherein the icon is associated with a first application of the one or more applications; and
   in response to a selection of the icon via the first screen device,
   sending, to a second screen device different from the first screen device,
   a signal instructing the second screen device to:
      retrieve, from a location indicated by the signal, the first application; and
      launch the first application.

2. The method of claim 1, further comprising:
   determining, based on occurrence of a particular event of a plurality of sequential events associated with the content item, one or more additional applications related to the particular event; and
   sending an additional icon for output via the first screen device, wherein the additional icon is configured to, after being selected, cause a download, or launch, of at least one of the one or more additional applications at the second screen device.

3. The method of claim 1, further comprising:
selecting, based on one or more factors, a plurality of applications; and
sending a plurality of icons to be output via the first screen device, wherein each of the plurality of icons corresponds to one of the plurality of applications,
wherein at least one of the plurality of applications is configured to output supplemental content via at the second screen device contemporaneously with an output of the content item via the first screen device.

4. The method of claim 1, further comprising:
sending item description information corresponding to the icon, wherein the item description information comprises a preview of features of the first application.

5. The method of claim 1, further comprising:
receiving, based on information indicating an input to the second screen device via the launched first application, a social media post for display via the first screen device, wherein the social media post is based on input received via the second screen device.

6. The method of claim 1, further comprising:
receiving, based on information indicating an input to the second screen device via the launched first application, a positional marker for display via the first screen device.

7. The method of claim 1, further comprising:
sending a listing, of a plurality of content items, for output by the first screen device, wherein the listing comprises a portion of a program guide listing for outputting the icon and wherein the information indicating the selection of the content item indicates
the selection of the content item from the listing of the plurality of content items.

8. The method of claim 1, wherein the causing output of the icon is based on a current time position in the output of the content item.

9. The method of claim 1, wherein the causing output causes the icon to appear adjacent to the content item on the first screen device.

10. The method of claim 1, wherein:
the icon is associated with a hypertext link; and
launching the first application comprises launching, on the second screen device, a browser to load content associated with the hypertext link.

11. The method of claim 1, wherein the signal comprises instructions to:
retrieve, from the location, an executable file associated with the first application, and
execute the executable file to launch the first application.

12. The method of claim 1, wherein the selection of the icon comprises a click of a cursor or press of a button; and
wherein the signal is configured to cause the second screen to automatically retrieve and launch the first application without further user input.

13. The method of claim 1, wherein sending the signal is based on the second screen device not comprising the first application.

14. An apparatus comprising:
one or more processors; and
memory storing instructions that, when executed by the one or more processors, configure the apparatus to:
determine, based on information indicating selection of a content item for output via a first screen device, one or more applications related to the content item;
cause output, via the first screen device, of the content item and an icon, wherein the icon is associated with a first application of the one or more applications; and
in response to selection of the icon via the first screen device, send, to a second screen device different from the first screen device, a signal instructing the second screen device to:
retrieve, from a location indicated by the signal, the first application; and
launch the first application.

15. The apparatus of claim 14, wherein the instructions, when executed by the one or more processors, further configure the apparatus to:
determine, based on occurrence of a particular event of a plurality of sequential events associated with the content item, one or more additional applications related to the particular event; and
send an additional icon for output via the first screen device, wherein the additional icon is configured to, after being selected, cause a download, or launch, of at least one of the one or more additional applications at the second screen device.

16. The apparatus of claim 14, wherein the instructions, when executed by the one or more processors, further configure the apparatus to:
select, based on one or more factors, a plurality of applications; and
send a plurality of icons to be output via the first screen device, wherein each of the plurality of icons corresponds to one of the plurality of applications,
wherein at least one of the plurality of applications is configured to output supplemental content via the second screen device contemporaneously with an output of the content item via the first screen device.

17. The apparatus of claim 14, wherein the instructions, when executed by the one or more processors, further configure the apparatus to:
send item description information corresponding to the icon, wherein the item description information comprises a preview of features of the first application.

18. The apparatus of claim 14, wherein the instructions, when executed by the one or more processors, further configure the apparatus to:
receive, based on information indicating an input to the second screen device via the launched first application, a social media post for display via the first screen device, wherein the social media post is based on input received via the second screen device.

19. The apparatus of claim 14, wherein the instructions, when executed by the one or more processors, further configure the apparatus to:
receive, based on information indicating an input to the second screen device via the launched first application, a positional marker for display via the first screen device.

20. The apparatus of claim 14, wherein the instructions, when executed by the one or more processors, further configure the apparatus to:
send a listing of a plurality of content items for output via the first screen device, wherein the listing comprises a portion of a program guide listing for outputting the icon and
wherein the information indicating the selection of the content item indicates the selection of the content item from the listing of the plurality of content items.

21. A system comprising:
a computing device and a gateway device,
wherein the computing device comprises:
  one or more first processors; and
  memory storing first instructions that, when executed by the one or more first processors, configure the computing device to:
    determine, based on information indicating selection of a content item for output via a first screen device, one or more applications related to the content item;
    cause output, via the first screen device, of the content item and an icon, wherein the icon is associated with a first application of the one or more applications; and
    in response to selection of the icon via the first screen device, send, to a second screen device different from the first screen device, a signal instructing the second screen device to:
      retrieve, from a location indicated by the signal, the first application; and
      launch the first application;
wherein the gateway device comprises:
  one or more second processors; and
  memory storing second instructions that, when executed by the one or more second processors, configure the gateway device to:
    receive the icon from the computing device; and
    send the icon to the first screen device.

22. The system of claim 21, wherein the first instructions, when executed by the one or more first processors, further configure the computing device to:
  determine, based on occurrence of a particular event of a plurality of sequential events associated with the content item, one or more additional applications related to the particular event; and
  send an additional icon for output via the first screen device, wherein the additional icon is configured to, after being selected, cause a download, or launch, of at least one of the one or more additional applications at the second screen device.

23. The system of claim 21, wherein the first instructions, when executed by the one or more first processors, further configure the computing device to:
  select, based on one or more factors, a plurality of applications; and
  send a plurality of icons to be output via the first screen device, wherein each of the plurality of icons corresponds to one of the plurality of applications,
  wherein at least one of the plurality of applications is configured to output supplemental content via the second screen device contemporaneously with an output of the content item via the first screen device.

24. The system of claim 21, wherein the first instructions, when executed by the one or more first processors, further configure the computing device to:
  send item description information corresponding to the icon, wherein the item description information comprises a preview of features of the first application.

25. The system of claim 21, wherein the first instructions, when executed by the one or more first processors, further configure the computing device to:
  receive, based on information indicating an input to the second screen device via the launched first application, a social media post for display via the first screen device, wherein the social media post is based on input received via the second screen device.

26. The system of claim 21, wherein the first instructions, when executed by the one or more first processors, further configure the computing device to:
  receive, based on information indicating an input to the second screen device via the launched first application, a positional marker for display via the first screen device.

27. The system of claim 21, wherein the first instructions, when executed by the one or more first processors, further configure the computing device to:
  send a listing of a plurality of content items for output via the first screen device, wherein the listing comprises a portion of a program guide listing for outputting the icon and wherein the information indicating the selection of the content item indicates the
  selection of the content item from the listing of the plurality of content items.

* * * * *